United States Patent
Adsumilli et al.

(10) Patent No.: US 10,965,868 B2
(45) Date of Patent: *Mar. 30, 2021

(54) APPARATUS AND METHODS FOR IMAGE ENCODING USING SPATIALLY WEIGHTED ENCODING QUALITY PARAMETERS

(71) Applicant: GoPro, Inc., Carlsbad, CA (US)

(72) Inventors: Balineedu Chowdary Adsumilli, San Francisco, CA (US); Adeel Abbas, Carlsbad, CA (US); Sumit Chawla, Carlsbad, CA (US)

(73) Assignee: GoPro, Inc., San Mateo, CA (US)

( * ) Notice: Subject to any disclaimer, the term of this patent is extended or adjusted under 35 U.S.C. 154(b) by 79 days.

This patent is subject to a terminal disclaimer.

(21) Appl. No.: 16/363,668

(22) Filed: Mar. 25, 2019

(65) Prior Publication Data

US 2019/0289208 A1    Sep. 19, 2019

Related U.S. Application Data

(63) Continuation of application No. 15/432,700, filed on Feb. 14, 2017, now Pat. No. 10,244,167.

(Continued)

(51) Int. Cl.
| | | |
|---|---|---|
| *G06K 9/00* | (2006.01) | |
| *H04N 5/232* | (2006.01) | |
| *H04N 19/597* | (2014.01) | |
| *H04N 19/122* | (2014.01) | |
| *H04N 19/115* | (2014.01) | |
| *H04N 19/117* | (2014.01) | |

(Continued)

(52) U.S. Cl.
CPC ....... *H04N 5/23238* (2013.01); *H04N 13/178* (2018.05); *H04N 13/243* (2018.05); *H04N 13/296* (2018.05); *H04N 13/344* (2018.05); *H04N 19/115* (2014.11); *H04N 19/117* (2014.11); *H04N 19/122* (2014.11); *H04N 19/126* (2014.11); *H04N 19/167* (2014.11); *H04N 19/57* (2014.11); *H04N 19/597* (2014.11)

(58) Field of Classification Search
None
See application file for complete search history.

(56) References Cited

U.S. PATENT DOCUMENTS

| | | |
|---|---|---|
| 8,606,073 B2 | 12/2013 | Woodman |
| 9,171,577 B1 | 10/2015 | Newman |

(Continued)

OTHER PUBLICATIONS

Achanta R., et al., 'Slic Superpixeis Gompared to State-of-The-Art Superpixei Methods,' IEEE Transactions on Pattern Analysis and Machine intelligence, 2012, vol. 34 (11), pp. 2274-2282.

(Continued)

*Primary Examiner* — Hadi Akhavannik
(74) *Attorney, Agent, or Firm* — Young Basile Hanlon & MacFarlane, P.C.

(57) ABSTRACT

Methods and apparatus for encoding and decoding image data based on one or more parameters. In one embodiment, various spatial portions or regions of image data (e.g., a still or moving image) are weighted according to the perceived or measured quality. Processing for these weighted regions can be selectively altered or adjusted so as to optimize one or more operational parameters including for example processing and/or memory requirements, or speed.

20 Claims, 15 Drawing Sheets

Related U.S. Application Data

(60) Provisional application No. 62/351,818, filed on Jun. 17, 2016.

(51) Int. Cl.
```
H04N 19/126    (2014.01)
H04N 19/167    (2014.01)
H04N 19/57     (2014.01)
H04N 13/243    (2018.01)
H04N 13/296    (2018.01)
H04N 13/178    (2018.01)
H04N 13/344    (2018.01)
```

(56) References Cited

U.S. PATENT DOCUMENTS

| | | | |
|---|---|---|---|
| 10,244,167 B2* | 3/2019 | Adsumilli | H04N 19/117 |
| 2003/0007567 A1 | 1/2003 | Newman | |
| 2005/0249296 A1 | 11/2005 | Axnas | |
| 2008/0225129 A1 | 9/2008 | Viinikanoja | |
| 2010/0033552 A1 | 2/2010 | Ogawa | |
| 2013/0202039 A1 | 8/2013 | Song | |
| 2013/0343665 A1 | 12/2013 | Maeda | |
| 2014/0143823 A1* | 5/2014 | Manchester | H04L 65/4084 725/116 |
| 2015/0163498 A1 | 6/2015 | Shimada | |
| 2016/0239340 A1 | 8/2016 | Chauvet | |
| 2016/0274338 A1 | 9/2016 | Davies | |

OTHER PUBLICATIONS

Allene C, et al,, 'Seamless Image-based Texture Atlases Using Multi-band Blending,' Pattern Recognition, 2008. ICPR 2008. 19th International Conference on, 2008. 4 pages.

Badrinarayanan V., et al., 'Segnet: a Deep Convoiutional Encoder-Decoder Architecture for Image Segmentation,' arXiv preprint arXiv: 1511.00561, 2015. 14 pages.

Barghout L. and Sheynin J., 'Real-world scene perception and perceptual organization: Lessons from Computer Vision'. Journal of Vision, 2013, vol. 13 (9). (Abstract). 1 page.

Barghout L., 'Visual Taxometric approach Image Segmentation using Fuzzy-Spatial Taxon Cut Yields Contextually Relevant Regions,' Communications in Computer and Information Science (CCIS), Springer-Verlag, 2014, pp. 163-173.

Bay H., et al., 'Surf: Speeded up Robust Features,' European Conference on Computer Vision, Springer Berlin Heidelberg, 2006, pp. 404-417.

Beier et al., 'Feature-Based Image Metamorphosis,' in Computer Graphics Journal, Jul. 1992, vol. 28 (2), pp. 35-42.

Brainard R.C., et al., "Low-Resolution TV: Subjective Effects of Frame Repetition and Picture Replenishment," Bell Labs Technical Journal, Jan. 1967, vol. 46 (1), pp. 261-271.

Burt et al., 'A Multiresolution Spline with Application to Image Mosaics,' in ACM Transactions on Graphics (TOG), 1983, vol. 2, No. 4, pp. 217-236.

Chan et al., 'Active contours without edges'. IEEE Transactions on Image Processing, 2001, 10 (2), pp. 266-277 (hereinafter 'Chan').

Chang H., etal., 'Super-resolution Through Neighbor Embedding,' Computer Vision and Pattern Recognition, 2004. CVPR2004. Proceedings of the 2004 IEEE Computer Society Conference on, vol. 1, 2004. 8 pages.

Elen, 'Whatever happened to Ambisonics' AudioMedia Magazine, Nov. 1991. 18 pages.

Gracias, et al., 'Fast Image Blending Using Watersheds and Graph Cuts,' Image and Vision Computing, 2009, vol. 27 (5), pp. 597-607.

Herbst E., et al., 'Occlusion Reasoning for Temporal Interpolation Using Optical Flow,' Department of Computer Science and Engineering, University of Washington, Tech. Rep. UW-CSE-09-08-01,2009. 41 pages.

Jakubowski M., et al., 'Block-based motion estimation algorithmsa survey,' Opto-Electronics Review 21, No. 1 (2013), pp. 88-102.

Kendall A., et al., 'Bayesian Segnet: Model Uncertainty in Deep Convolutional Encoder-Decoder Architectures for Scene Understanding,' arXiv: 1511.02680, 2015. (11 pages).

Lowe D.G., 'Object Recognition From Local Scale-invariant Features,' Computer vision, The proceedings of the seventh IEEE international conference on 1999, vol. 2, pp. 1150-1157.

Mitzel D., et al., 'Video Super Resolution Using Duality Based TV-I1 Optical Flow,' Joint Pattern Recognition Symposium, 2009, pp. 432-441.

Perez et al., 'Poisson Image Editing,' in ACM Transactions on Graphics (TOG), 2003, vol. 22, No. 3, pp. 313-318.

Schick A., et al., "Improving Foreground Segmentations with Probabilistic Superpixel Markov Random Fields," 2012 IEEE Computer Society Conference on Computer Vision and Pattern Recognition Workshops, 2012, pp. 27-31.

Suzuki et al., 'Inter Frame Coding with Template Matching Averaging,' in IEEE international Conference on Image Processing Proceedings (2007), vol (iII), pp. 409-412.

Szeliski R., "Computer Vision: Algorithms and Applications," Springer Science & Business Media, 2010, 979 pages.

Thaipanich T., et al., "Low Complexity Algorithms for Robust Video frame rate up-conversion (FRUC) technique," IEEE Transactions on Consumer Electronics, Feb. 2009, vol. 55 (1),pp. 220-228.

Xiao, et al., 'Multiple View Semantic Segmentation for Street View Images,' 2009 IEEE 12th International Conference on Computer Vision, 2009, pp. 686-693.

Xiong Y et ai 'Gradient Domain Image Blending and Implementation on Mobile Devices,' International Conference on Mobile Computing, Applications, and Services, Springer Berlin Heidelberg, 2009, pp. 293-306.

Zhai et al., "A Low Complexity Motion Compensated Frame Interpolation Method," in IEEE International Symposium on Circuits and Systems (2005), pp. 4927-4930.

Zhang., "A Flexible New Technique for Camera Calibration" IEEE Transactions, dated Nov. 2000, vol. 22, No. 11, pp. 1330-1334.

* cited by examiner

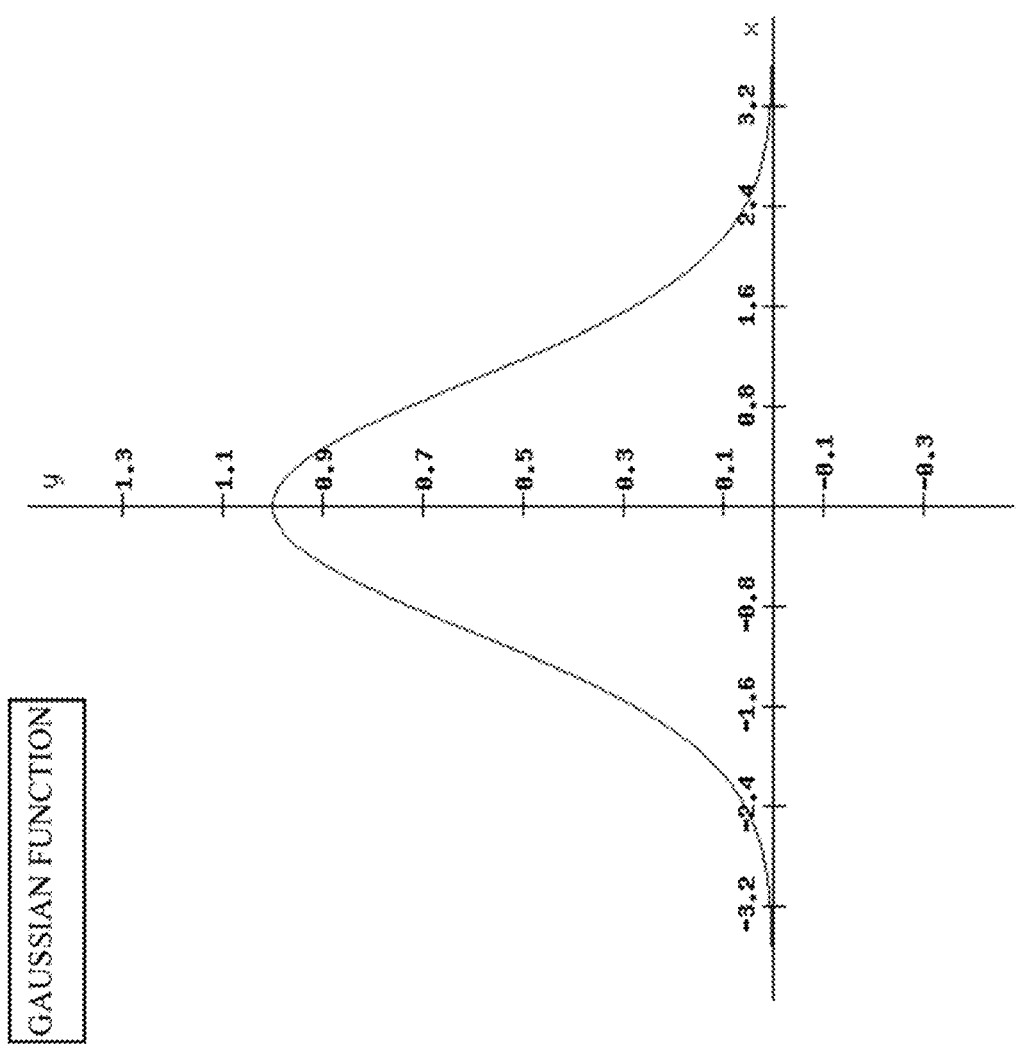

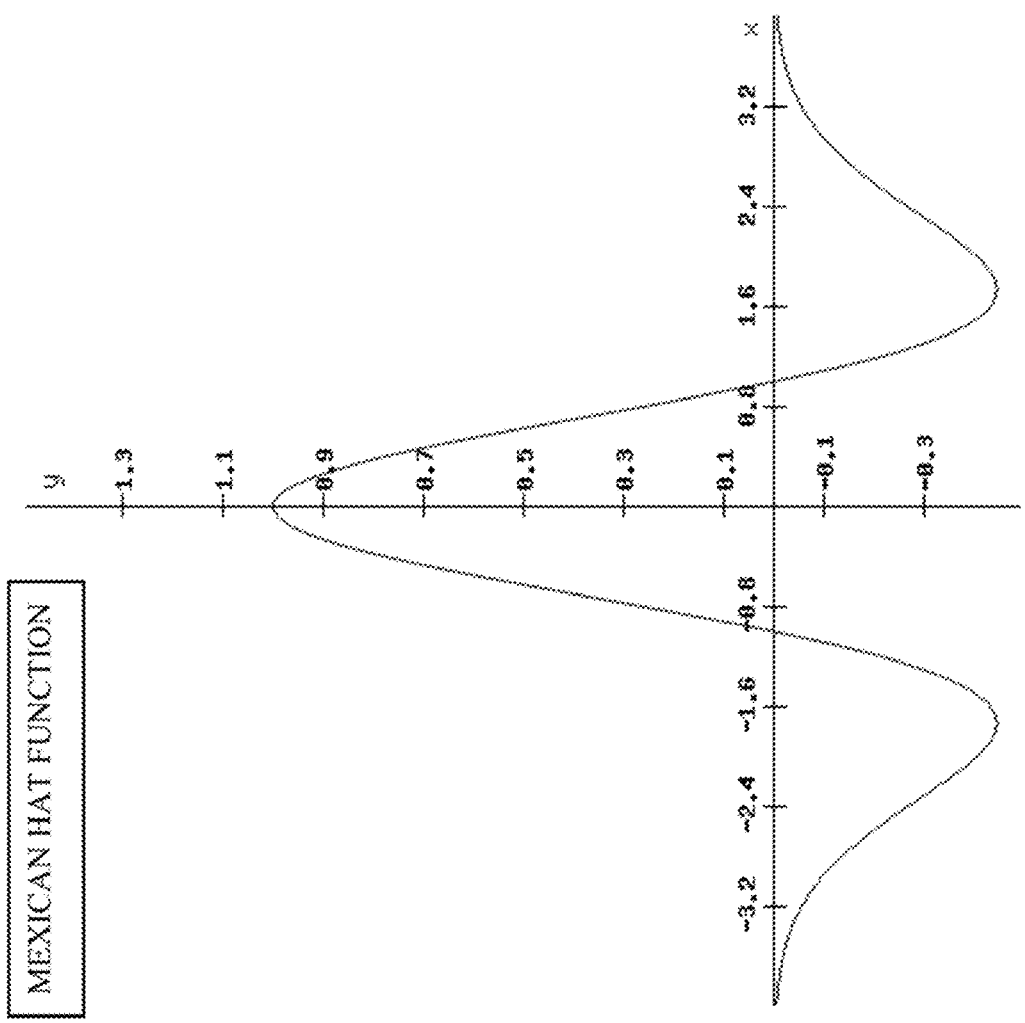

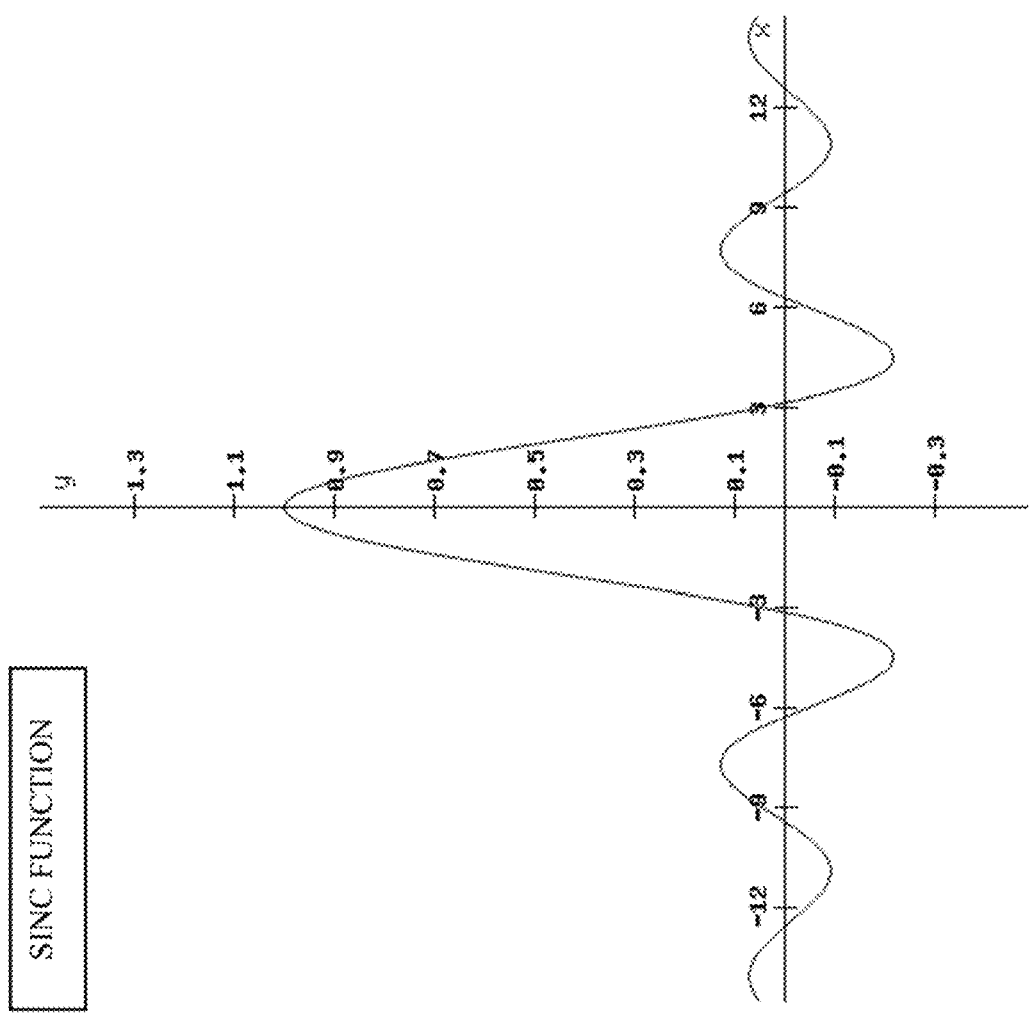

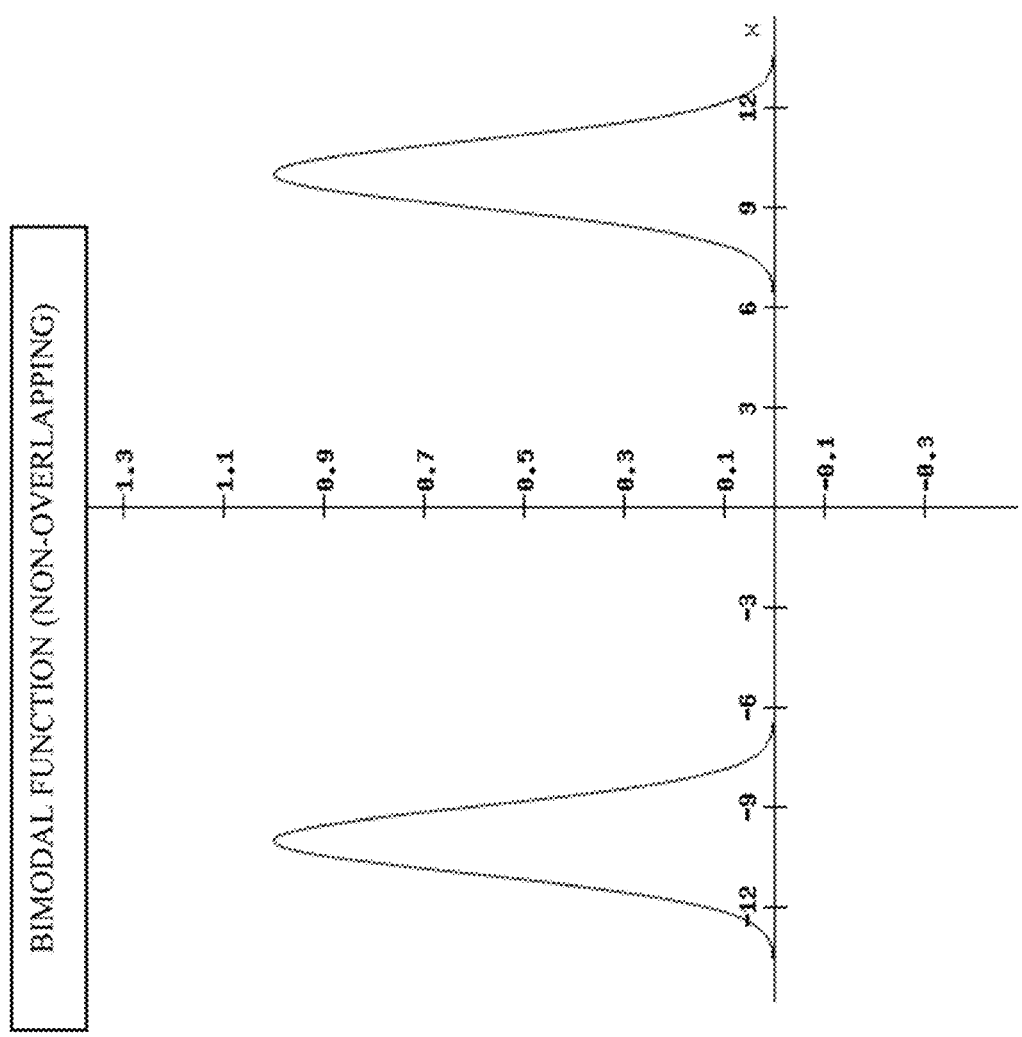

APPARATUS AND METHODS FOR IMAGE ENCODING USING SPATIALLY WEIGHTED ENCODING QUALITY PARAMETERS

PRIORITY

This application is a continuation of, and claims the benefit of priority to, U.S. patent application Ser. No. 15/432,700 of the same title filed on Feb. 14, 2017, which claims the benefit of priority to U.S. Provisional Patent Application Ser. No. 62/351,818 of the same title filed on Jun. 17, 2016, the contents of each of the foregoing being incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE DISCLOSURE

Field of the Disclosure

The present disclosure relates generally to decoding and/or encoding of image and/or video content and more particularly, in one exemplary aspect, to providing spatially weighted encoding quality parameters to reflect differences in an underlying quality of visual content.

Description of Related Art

Historically, pictures (still images) and video (moving images) were captured with single image capture devices that represented images and/or video from a single vantage point with as little distortion as possible. Within this environment, prior art displays also assumed minimal distortion throughout the image space. Consequently, visual encoding processes were designed to encode content without regard for spatial considerations; in other words, existing solutions encoded and decoded video (or images) using encoding quality parameters that did not vary over the image space.

With the advent of more sophisticated image processing software and changes in image capture techniques and customer tastes, "non-uniform image capture" (e.g., binocular, spherical and/or panoramic image content) has steadily increased in adoption and usage. Unfortunately, non-uniform image capture does not fit the traditional paradigm (e.g., single vantage point, minimal distortion), and thus existing encoding/decoding schemes are poorly suited for rendering such content. For example, non-uniform image capture may result in visual distortions and/or undesirable artifacts when processed under traditional methods. Moreover, rendering software may experience higher processing burden when attempting to correct, render, post-process, and/or edit non-uniform image content.

To these ends, improved solutions are needed for encoding and decoding images and video content which appropriately account for non-uniform elements or characteristics of the content. Such elements or characteristics can be used by rendering software, or other post-processing mechanism to improve the accuracy of reproduction, as well as reduce processing burden, memory consumption and/or other processing resources. For example, exemplary solutions would reduce the communications and/or processing bandwidth and energy use associated with viewing spherical or other non-traditional content on mobile devices.

SUMMARY

The present disclosure satisfies the foregoing needs by providing, inter alia, methods and apparatus for encoding and decoding images and video content which appropriately account for non-uniform elements or characteristics of the content.

In one aspect, a computerized apparatus is disclosed. In one embodiment, the computerized apparatus includes one or more processors in operative communication with a computer readable storage apparatus having a storage medium, the storage medium comprising one or more computer-executable instructions that, when executed by the one or more processors is configured to: obtain visual content, the visual content having a plurality of spatial portions; encode each of the plurality of spatial portions of the visual content; store the encoded plurality of spatial portions along with respective spatially weighted encoding quality parameters; retrieve the stored encoded plurality of spatial portions along with the respective spatially weighted encoding quality parameters; and encode individual spatial portions of the visual content using respective spatially weighted encoding quality parameters.

In one variant, the respective spatially weighted encoding quality parameters are configured to define a function or curve that describes a spatially weighted encoding quality over an image space of the visual content.

In another variant, the function or curve is derived based on a spatial distortion introduced by an image capturing device.

In yet another variant, the spatial distortion includes a pre-defined spatial distortion specification associated with a lens of the image capturing device.

In yet another variant, the spatial distortion includes a user-configurable spatial distortion parameter.

In yet another variant, the visual content includes panoramic content that was captured using two or more image capturing devices.

In yet another variant, the respective spatially weighted encoding quality parameters are separately retrievable so as to enable provision of the visual content to legacy display devices, the legacy display devices not being compatible with the spatially weighted encoding quality parameters.

In yet another variant, the encoding of the individual spatial portions of the visual content using the respective spatially weighted encoding quality parameters occurs at the time of provision of the visual content to a display device.

In yet another variant, the encoding of the individual spatial portions of the visual content using the respective spatially weighted encoding quality parameters is dynamically determined based at least in part on a capability of differing display devices.

In a second aspect, a method of processing digital image data is disclosed. In one embodiment, the method includes identifying one or more portions of the digital image data having a first level of image quality; and altering processing of the identified one or more portions as compared to that of other portions of the digital image data using spatially weighted encoding quality parameters.

In one variant, the altering of the processing includes dedicating fewer data processing resources to the identified one or more portions as compared to that of the other portions.

In another variant, the other portions comprise a second level of image quality that is greater than the first level of image quality; and the altering of the processing includes dedicating greater data processing resources to the identified one or more portions as compared to that of the other portions so as to decrease a difference between the first level of image quality and the second level of image quality.

In yet another variant, the other portions include a second level of image quality that is greater than the first level of image quality; and the altering of the processing is based at least in part on a metric relating to a difference between the first level of image quality and the second level of image quality.

In yet another variant, the method further includes obtaining the digital image data; and compressing the digital image data. The metric includes a mean square error (MSE) that is representative of a cumulative squared error between the obtained digital image data and the compressed digital image data.

In a third aspect, a computer readable storage apparatus is disclosed. In one embodiment, the computer readable storage apparatus includes a storage medium, the storage medium including one or more computer-executable instructions which, when executed, is configured to: retrieve visual content, the visual content inclusive of a plurality of spatial portions; retrieve stored spatially weighted encoding quality parameters, the spatially weighted encoding quality parameters associated with respective ones of the plurality of spatial portions; and encode individual spatial portions of the visual content using respective ones of the spatially weighted encoding quality parameters.

In one variant, the computer readable storage apparatus further includes one or more computer-executable instructions which, when executed, is configured to: provide the encoded individual spatial portions of the visual content to a display device.

In another variant, the computer readable storage apparatus further includes one or more computer-executable instructions which, when executed, is configured to: encode the individual spatial portions of the visual content based at least in part on one or more parameters associated with the display device.

In yet another variant, the stored spatially weighted encoding quality parameters are determined at least in part on lens parameters associated with an image capturing device utilized to capture the visual content.

In yet another variant, the image capturing device includes two or more lenses configured to capture panoramic content.

In yet another variant, the computer readable storage apparatus further includes one or more computer-executable instructions which, when executed, is configured to: receive an adjusted spatially weighted encoding quality parameter from a user subsequent to the provision the encoded individual spatial portions of the visual content to the display device; encode at least a portion of the individual spatial portions of the visual content using the adjusted spatially weighted encoding quality parameter; and provide the encoded at least a portion of the individual spatial portions of the visual content using the adjusted spatially weighted encoding quality parameter to the display device.

In a fourth aspect, an integrated circuit is disclosed. In one embodiment, the integrated circuit includes logic that is configured to: encode each of a plurality of spatial portions of visual content; retrieve stored encoded spatial portions along with respective spatially weighted encoding quality parameters; and encode individual spatial portions of the visual content using respective spatially weighted encoding quality parameters.

Other features and advantages of the present disclosure will immediately be recognized by persons of ordinary skill in the art with reference to the attached drawings and detailed description of exemplary embodiments as given below.

BRIEF DESCRIPTION OF THE DRAWINGS

FIG. 2B is a two dimensional (2D) graphical plot of one exemplary Gaussian mathematical relationship for spatial distortion, useful in conjunction with the principles described herein.

FIG. 2C is a two dimensional (2D) graphical plot of one exemplary Mexican Hat mathematical relationship for spatial distortion, useful in conjunction with the principles described herein.

FIG. 2D is a two dimensional (2D) graphical plot of one exemplary sinc mathematical relationship for spatial distortion, useful in conjunction with the principles described herein.

FIG. 2E is a two dimensional (2D) graphical plot of a first exemplary multimodal mathematical relationship for spatial distortion, useful in conjunction with the principles described herein.

FIG. 2I is a three dimensional (3D) graphical plot of an exemplary bimodal mathematical relationship for spatial distortion, useful in conjunction with the principles described herein.

Figure 1A:
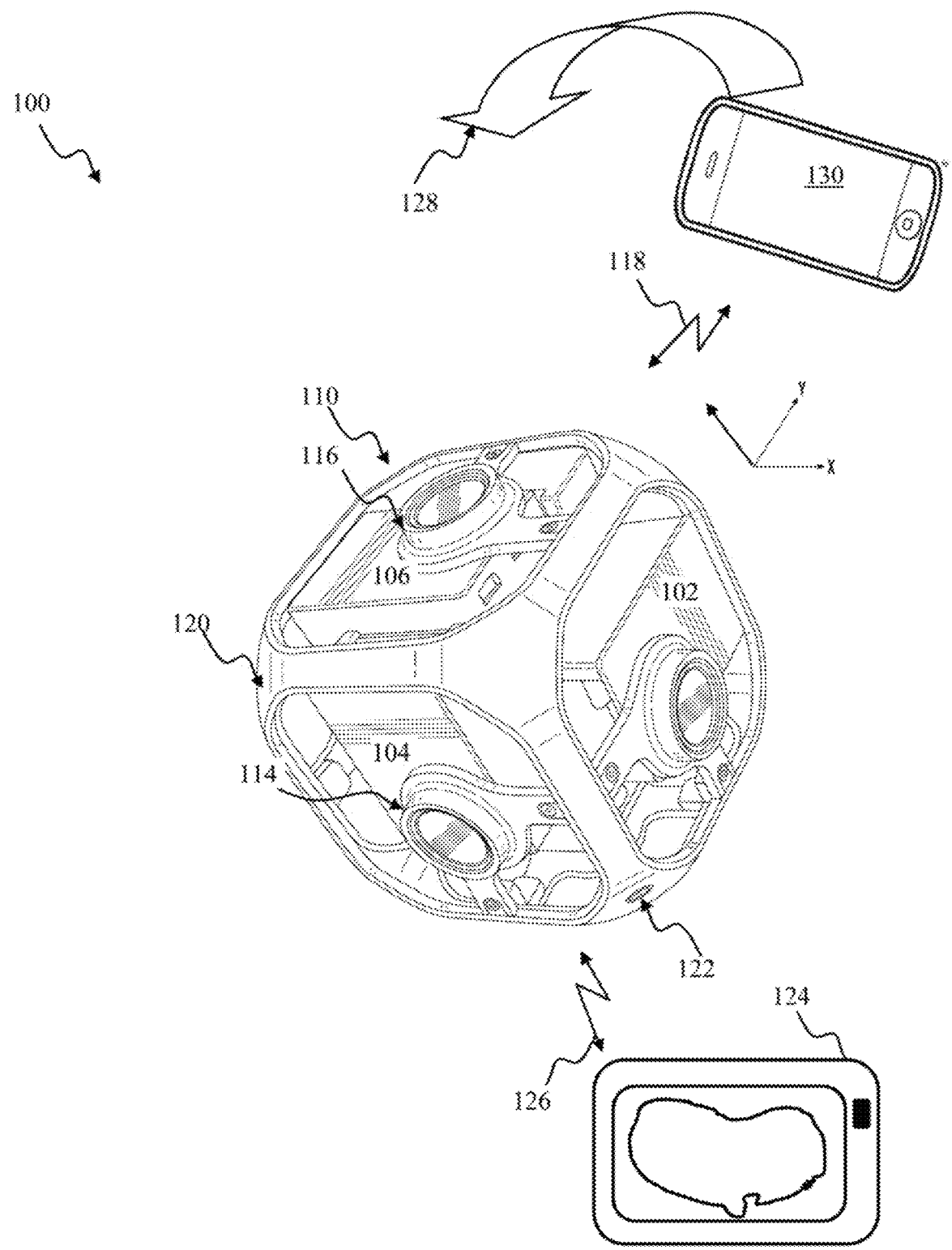
FIG. 1A illustrates a system for content capture and viewing, useful with various aspects of the present disclosure.

All Figures disclosed herein are © Copyright 2017 GoPro, Inc. All rights reserved.

DETAILED DESCRIPTION

Implementations of the present technology will now be described in detail with reference to the drawings, which are provided as illustrative examples so as to enable those skilled in the art to practice the technology. Notably, the figures and examples below are not meant to limit the scope of the present disclosure to any single implementation or implementations, but other implementations are possible by way of interchange of, substitution of, or combination with some or all of the described or illustrated elements. Wherever convenient, the same reference numbers will be used throughout the drawings to refer to same or like parts.

Systems and methods for providing spatially weighted encoding quality parameters to reflect differences in an underlying quality of visual content, are provided herein. Existing non-uniform image content may be characterized by distortion that disproportionately affects certain spatial areas of an image (e.g., the periphery of the image) Presently available standard video compression codecs, e.g., H.264 (described in ITU-T H.264 (01/2012) and/or ISO/IEC 14496-10:2012, Information technology—Coding of audio-visual objects—Part 10: Advanced Video Coding, each of the foregoing incorporated herein by reference in its entirety), High Efficiency Video Coding (HEVC), also known as H.265 (described in e.g., ITU-T Study Group 16—Video Coding Experts Group (VCEG)—ITU-T H.265, and/or ISO/IEC JTC 1/SC 29/WG 11 Motion Picture Experts Group (MPEG)—the HEVC standard ISO/IEC 23008-2:2015, each of the foregoing incorporated herein by reference in its entirety), and/or VP9 video codec (described at e.g., http://www.webmproject.org/vp9, each of the foregoing incorporated herein by reference in its entirety), may prove non-optimal for processing visual content that has encoding quality parameters that vary as a function of spatial location within the image.

As a brief aside, consider so-called "fisheye" lens cameras which produce a visually distorted panoramic or hemispherical image. Instead of traditional straight lines of perspective (rectilinear images), a fisheye lens produces a characteristic convex, non-rectilinear appearance. More directly, the center of the fisheye image experiences the least distortion, whereas the edges of the fisheye image experience large distortive effects. When encoded and/or decoded, the edges of the fisheye image are more prone to inaccuracy (as a function of distortion) than the center. More generally, certain so-called "spherical" lenses provide a wider field of view (FOV), at the expense of non-rectilinear distortions. One common usage of spherical lenses includes the use of e.g., digital post-processing to render a dynamically adjustable rectilinear view of a smaller portion of the visual content (i.e., allowing a user to "look around" the same source image.)

Encoding quality is not always a product of capture; for example, encoding quality may be introduced by post-processing that interpolates and/or extrapolates image data. For example, consider software that "stitches" together multiple partially overlapping images to achieve panoramic effects and/or other artificially enhanced field of views. Since the source images for the stitched image are taken from slightly different vantage points (i.e., with slight parallax) under slightly different time, angle, and light conditions. The stitching software constructs the panoramic image by interpolating/extrapolating image content from the source images. This can result in certain image artifacts, ghost images, or other undesirable effects.

To these ends, various aspects of the present disclosure spatially weight encoding quality parameters to reflect differences in an underlying quality of visual content. More directly, since different portions of the image have different levels of quality, the different quality parameters can be used to appropriately adjust the fidelity of reproduction attributed to non-uniform image capture, post-processing, and/or other parameters. While the following disclosure is primarily discussed with respect to spatial contexts; artisans of ordinary skill in the related arts will readily appreciate that the principles described herein may be broadly applied to any portion of an image and/or video. For example, temporal portions of a video stream may be associated with temporally weighted encoding quality parameters. Similarly, metadata portions of visual content may be associated with different degrees of weighted encoding quality parameters.

Exemplary Apparatus—

FIG. 1A illustrates an exemplary image/video capture system configured for acquiring panoramic content, in accordance with one implementation. The system 100 of FIG. 1A may include capture apparatus 110, such as e.g., GoPro® activity camera, e.g., HERO4 Silver™, and/or other image capture devices.

The exemplary capture apparatus 110 may include 6-cameras (e.g., 104, 106, 102) disposed in a prescribed configuration or relationship; e.g., cube-shaped cage 120 as shown. The cage 120 dimensions in this implementation are selected to be between 25 mm and 150 mm, preferably 105 mm in some particular implementations. The cage 120 may be outfitted with a mounting port 122 configured to enable attachment of the capture apparatus to a supporting structure (e.g., a tripod, a photo stick). The cage 120 may provide a rigid support structure. Use of a rigid structure may ensure that orientation of individual cameras with respect to one another may remain constant, or a given configuration maintained during operation of the apparatus 110.

Individual capture devices (e.g., 102) may include for instance a video camera device, such as described in, e.g., such as described in U.S. patent application Ser. No. 14/920, 427 entitled "APPARATUS AND METHODS FOR EMBEDDING METADATA INTO VIDEO STREAM" filed on Oct. 22, 2015, the foregoing being incorporated herein by reference in its entirety.

In some implementations, the capture device may include two camera components (including a lens and imaging sensors) that are disposed in a Janus configuration, i.e., back to back such as described in U.S. patent application Ser. No. 29/548,661, entitled "MULTI-LENS CAMERA" filed on Dec. 15, 2015, the foregoing being incorporated herein by reference in its entirety, although it is appreciated that other configurations may be used.

The capture apparatus 110 may be configured to obtain imaging content (e.g., images and/or video) with a prescribed field of view (FOV), up to and including a 360° field of view (whether in one dimension or throughout all dimensions), also referred to as panoramic or spherical content, e.g., such as shown and described in U.S. patent application Ser. No. 14/949,786, entitled "APPARATUS AND METHODS FOR IMAGE ALIGNMENT" filed on Nov. 23, 2015, and/or U.S. patent application Ser. No. 14/927,343, entitled "APPARATUS AND METHODS FOR ROLLING SHUTTER COMPENSATION FOR MULTI-CAMERA SYS- TEMS", filed Oct. 29, 2015, each of the foregoing being incorporated herein by reference in its entirety.

Individual cameras (e.g., 102, 104, 106) may be characterized by, for example, a prescribed field of view (e.g., 120°) in a longitudinal dimension, and another field of view (e.g., 90°) in a latitudinal dimension. In order to provide for an increased overlap between images obtained with adjacent cameras, image sensors of any two adjacent cameras may be configured at 90° with respect to one another. By way of non-limiting illustration, the longitudinal dimension of the camera 102 sensor may be oriented at 90° with respect to the longitudinal dimension of the camera 104 sensor; the longitudinal dimension of camera 106 sensor may be oriented at 90° with respect to the longitudinal dimension 116 of the camera 104 sensor. The camera sensor configuration illustrated in FIG. 1A, may provide for 420° angular coverage in vertical and/or horizontal planes. Overlap between fields of view of adjacent cameras may provide for an improved alignment and/or stitching of multiple source images to produce, e.g., a panoramic image, particularly when source images may be obtained with a moving capture device (e.g., rotating camera).

Individual cameras of the apparatus 110 may include a lens e.g., lens 114 of the camera 104, lens 116 of the camera 106. In some implementations, the individual lens may be characterized by what is referred to as "fisheye" pattern and produce images characterized by fisheye (or near-fisheye) field of view (FOV). Images captured by two or more individual cameras of the apparatus 110 may be combined using stitching of fisheye or other projections of captured images to produce an equirectangular planar image, in some implementations, e.g., such as shown in U.S. patent application Ser. No. 14/920,427 entitled "APPARATUS AND METHODS FOR EMBEDDING METADATA INTO VIDEO STREAM" filed on Oct. 22, 2015, incorporated herein by reference in its entirety.

The capture apparatus 110 may house one or more internal metadata sources, e.g., video, inertial measurement unit, global positioning system (GPS) receiver component and/or other metadata source. In some implementations, the capture apparatus 110 may include a device described in detail in U.S. patent application Ser. No. 14/920,427, entitled "APPARATUS AND METHODS FOR EMBEDDING METADATA INTO VIDEO STREAM" filed on Oct. 22, 2015, incorporated supra. The capture apparatus 110 may include one or optical elements 102. Individual optical elements 116 may include, by way of non-limiting example, one or more of standard lens, macro lens, zoom lens, special-purpose lens, telephoto lens, prime lens, achromatic lens, apochromatic lens, process lens, wide-angle lens, ultra-wide-angle lens, fisheye lens, infrared lens, ultraviolet lens, perspective control lens, other lens, and/or other optical elements.

The capture apparatus 110 may include one or more image sensors including, by way of non-limiting example, one or more of charge-coupled device (CCD) sensor, active pixel sensor (APS), complementary metal-oxide semiconductor (CMOS) sensor, N-type metal-oxide-semiconductor (NMOS) sensor, and/or other image sensors. The capture apparatus 110 may include one or more microphones configured to provide audio information that may be associated with images being acquired by the image sensor.

The capture apparatus 110 may be interfaced to an external metadata source 124 (e.g., GPS receiver, cycling computer, metadata puck, and/or other device configured to provide information related to system 100 and/or its environment) via a remote link 126. The capture apparatus 110 may interface to an external user interface device 130 via the link 118. In some implementations, the external user interface device 130 may correspond to a smartphone, a tablet computer, a phablet, a smart watch, a portable computer, vehicular telematics system, and/or other device configured to receive user input and communicate information with the camera capture device 110. In some implementation, the capture apparatus 110 may be configured to provide panoramic content (or portion thereof) to the external user interface device 130 for viewing.

In one or more implementations, individual links 126, 118 may utilize any practical wireless interface configuration, e.g., Wi-Fi™, Bluetooth® (BT), cellular data link, ZigBee®, near field communications (NFC) link, e.g., using ISO/IEC 14443 protocol, ANT+ link, and/or other wireless communications link. In some implementations, individual links 126, 118 may be effectuated using a wired interface, e.g., HDMI™, USB™, digital video interface (DVT™), DisplayPort® interface (e.g., digital display interface developed by the Video Electronics Standards Association (VESA)®, Ethernet™, Thunderbolt™), and/or other interface.

In some implementations (not shown), one or more external metadata devices may interface to the apparatus 110 via a wired link, e.g., HDMI, USB, coaxial audio, and/or other interface. In one or more implementations, the capture apparatus 110 may house one or more sensors (e.g., GPS, pressure, temperature, heart rate, and/or other sensors). The metadata obtained by the capture apparatus 110 may be incorporated into the combined multimedia stream using any applicable methodologies including for example those described in U.S. patent application Ser. No. 14/920,427 entitled "APPARATUS AND METHODS FOR EMBEDDING METADATA INTO VIDEO STREAM" filed on Oct. 22, 2015, incorporated supra.

The user interface of the external user interface device 130 may operate a software application (e.g., GoPro Studio, GoPro App, and/or other application) configured to perform a variety of operations related to camera configuration, control of video acquisition, editing and/or display of video captured by the camera apparatus 110. An application (e.g., GoPro App) may enable a user to create short video clips and share clips to a cloud service (e.g., Instagram®, Facebook®, YouTube®, Dropbox®); perform full remote control of camera 110 functions, live preview video being captured for shot framing, mark key moments while recording with HiLight Tag, View HiLight Tags in GoPro Camera Roll for location and/or playback of video highlights, wirelessly control camera software, and/or perform other functions. Various methodologies may be utilized for configuring the camera apparatus 110 and/or displaying the captured information, including those described in U.S. Pat. No. 8,606,073, entitled "BROADCAST MANAGEMENT SYSTEM", issued Dec. 10, 2013, the foregoing being incorporated herein by reference in its entirety.

By way of an illustration, the external user interface device 130 may receive user settings that characterize image resolution (e.g., 3840 pixels by 2160 pixels), frame rate (e.g., 60 frames per second (fps)), and/or other settings (e.g., location) related to the activity (e.g., mountain biking) being captured. The external user interface device 130 may communicate the settings to the camera apparatus 110.

A user may utilize the external user interface device 130 to view content acquired by the capture apparatus 110. The display of the external user interface device 130 may act as a viewport into 3D space of the panoramic content. In some implementations, the external user interface device 130 may communicate additional information (e.g., metadata) to the camera apparatus 110. By way of an illustration, the external user interface device 130 may provide orientation information of the external user interface device 130, with respect to a given coordinate system, to the apparatus 110 so as to enable determination of a viewport location and/or dimensions for viewing of a portion of the panoramic content. For instance, a user may rotate (e.g., sweep) the external user interface device 130 through an arc in space (as illustrated by arrow 128 in FIG. 1A). The external user interface device 130 may communicate display orientation information to the capture apparatus 110. The capture apparatus 110 may provide an encoded bit stream configured to enable viewing of a portion of the panoramic content corresponding to a portion of the environment of the display location as it traverses the path 128.

The capture apparatus 110 may include a display configured to provide information related to camera operation mode (e.g., image resolution, frame rate, capture mode (sensor, video, photo), connection status (connected, wireless, wired connection), power mode (e.g., standby, sensor mode, video mode), information related to metadata sources (e.g., heart rate, GPS), and/or other information. The capture apparatus 110 may include a user interface component (e.g., one or more buttons) configured to enable user to start, stop, pause, resume sensor and/or content capture. User commands may be encoded using a variety of approaches including but not limited to duration of button press (pulse width modulation), number of button presses (pulse code modulation) and/or a combination thereof. By way of an illustration, two short button presses may initiate sensor acquisition mode described in detail elsewhere; single short button press may be used to (i) communicate initiation of video and/or photo capture and cessation of video and/or photo capture (toggle mode); or (ii) video and/or photo capture for a given time duration or number of frames (burst capture). It will be recognized by those skilled in the arts that various user command communication implementations may be realized, e.g., short/long button presses.

Figure 1B:
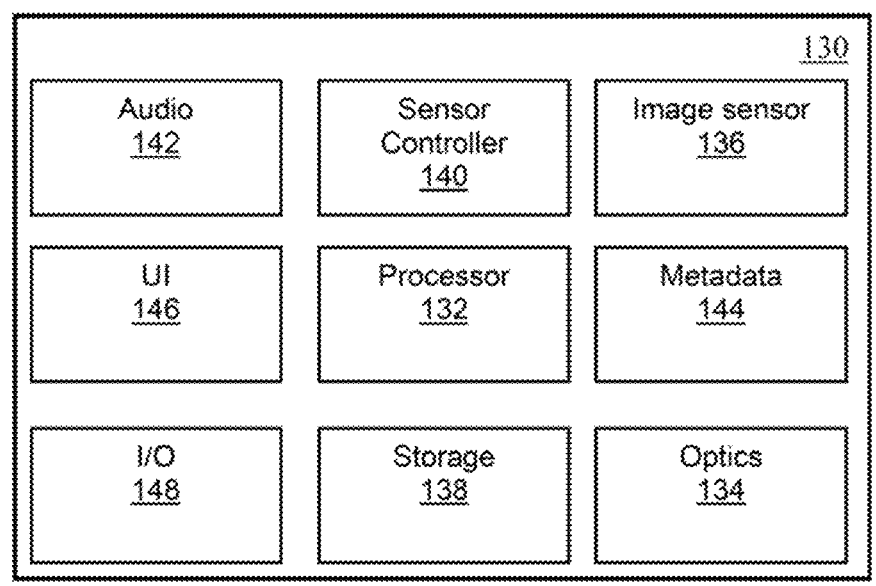
FIG. 1B is a functional block diagram illustrating a capture device for use with, e.g., system of FIG. 1A.

FIG. 1B illustrates one generalized implementation of a camera apparatus for collecting metadata and content. The apparatus of FIG. 1B may include a capture device 110 that may include one or more processors 132 (such as system on a chip (SOC), microcontroller, microprocessor, central processing unit (CPU), digital signal processor (DSP), application specific integrated circuit (ASIC), general processing unit (GPU), and/or other processors) that at least partly control the operation and functionality of the capture device 110. In some implementations, the capture device 110 in FIG. 1B may correspond to an action camera configured to capture photo, video and/or audio content.

The capture device 110 may include an optics module 134. In one or more implementations, the optics module 134 may include, by way of non-limiting example, one or more of standard lens, macro lens, zoom lens, special-purpose lens, telephoto lens, prime lens, achromatic lens, apochromatic lens, process lens, wide-angle lens, ultra-wide-angle lens, fisheye lens, infrared lens, ultraviolet lens, perspective control lens, other lens, and/or other optics component. In some implementations the optics module 134 may implement focus controller functionality configured to control the operation and configuration of the camera lens. The optics module 134 may receive light from an object and couple received light to an image sensor 136. The image sensor 136 may include, by way of non-limiting example, one or more of charge-coupled device sensor, active pixel sensor, complementary metal-oxide semiconductor sensor, N-type metal-oxide-semiconductor sensor, and/or other image sensor. The image sensor 136 may be configured to capture light waves gathered by the optics module 134 and to produce image(s) data based on control signals from the sensor controller module 140. Optics module 134 may include focus controller configured to control the operation and configuration of the lens. The image sensor may be configured to generate a first output signal conveying first visual information regarding the object. The visual information may include, by way of non-limiting example, one or more of an image, a video, and/or other visual information. The optical element, and the first image sensor may be embodied in a housing.

In some implementations, the image sensor module 136 may include, without limitation, video sensors, audio sensors, capacitive sensors, radio sensors, accelerometers, vibrational sensors, ultrasonic sensors, infrared sensors, radar, LIDAR and/or sonars, and/or other sensory devices.

The apparatus 110 may include one or more audio components 142 e.g., microphone(s) and/or speaker(s). The microphone(s) may provide audio content information. Speakers may reproduce audio content information.

The apparatus 110 may include a sensor controller module 140. The sensor controller module 140 may be used to operate the image sensor 136. The sensor controller module 140 may receive image or video input from the image sensor 136; audio information from one or more microphones, such as 142. In some implementations, audio information may be encoded using audio coding format, e.g., AAC, AC3, MP3, linear PCM, MPEG-H and or other audio coding format (audio codec). In one or more implementations of "surround" based experiential capture, multi-dimensional audio may complement e.g., panoramic or spherical video; for example, the audio codec may include a stereo and/or 3-dimensional audio codec, e.g., an Ambisonic codec such as described at http://www.ambisonic.net/ and http://www-.digital brainstorming.ch/db_data/eve/ambisonics/text01.pdf, the foregoing being incorporated herein by reference in its entirety.

The apparatus 110 may include one or more metadata modules 144 embodied within the camera housing and/or disposed externally to the camera. The processor 132 may interface to the sensor controller 140 and/or one or more metadata modules 144. Each metadata module 144 may include sensors such as an inertial measurement unit (IMU) including one or more accelerometers and/or gyroscopes, a magnetometer, a compass, a global positioning system (GPS) sensor, an altimeter, ambient light sensor, temperature sensor, and/or other environmental sensors. The capture device 110 may contain one or more other metadata/telemetry sources, e.g., image sensor parameters, battery monitor, storage parameters, and/or other information related to camera operation and/or capture of content. Each metadata module 144 may obtain information related to environment of the capture device and an aspect in which the content is captured. By way of a non-limiting example: (i) an accelerometer may provide device motion information, including velocity and/or acceleration vectors representative of motion of the capture device 110; (ii) a gyroscope may provide orientation information describing the orientation of the device 110; (iii) a GPS sensor may provide GPS coordinates, and time, that identify the location of the device 110; and (iv) an altimeter may provide the altitude of the capture device 110. In some implementations, the internal metadata module 144 may be rigidly coupled to the capture device 110 housing such that any motion, orientation or change in location experienced by the device 110 is also experienced by the metadata sensors 144. The sensor controller module 140 and/or processor 132 may be operable to synchronize various types of information received from the metadata sources. For example, timing information may be associated with the sensor data. Using the timing information metadata information may be related to content (e.g., photo/video) captured by the image sensor 136. In some implementations, the metadata capture may be decoupled from video/image capture. That is, metadata may be stored before, after, and in-between one or more video clips and/or images. In one or more implementations, the sensor controller module 140 and/or the processor 132 may perform operations on the received metadata to generate additional metadata information. For example, a microcontroller may integrate received acceleration information to determine a velocity profile of the capture device 110 during the recording of a video. In some implementations, video information may consist of multiple frames of pixels using any applicable encoding method (e.g., H262, H.264, Cineform® and/or other standard).

The capture device 110 may include electronic storage 138. The electronic storage 138 may include a non-transitory system memory module that is configured to store executable computer instructions that, when executed by the processor 132, perform various device functionalities including those described herein. The electronic storage 138 may also include storage memory configured to store content (e.g., metadata, images, audio) captured by the apparatus.

In one such exemplary embodiment, the electronic storage 138 may include non-transitory memory configured to store configuration information and/or processing code configured to enable, e.g., video information, metadata capture and/or to produce a multimedia stream including, e.g., a video track and metadata in accordance with the methodology of the present disclosure. In one or more implementations, the processing configuration may be further parameterized according to, without limitation: capture type (video, still images), image resolution, frame rate, burst setting, white balance, recording configuration (e.g., loop mode), audio track configuration, and/or other parameters that may be associated with audio, video and/or metadata capture. Additional memory may be available for other hardware/firmware/software needs of the apparatus 110. The processor 132 may interface to the sensor controller module 140 in order to obtain and process sensory information for, e.g., object detection, face tracking, stereo vision, and/or other tasks.

The processor 132 may interface with the mechanical, electrical, sensory, power, and user interface modules via driver interfaces and/or software abstraction layers. Additional processing and memory capacity may be used to support these processes. It will be appreciated that these components may be fully controlled by the processor 132. In some implementations, one or more components may be operable by one or more other control processes (e.g., a GPS receiver may include a processing apparatus configured to provide position and/or motion information to the processor 132 in accordance with a given schedule (e.g., values of latitude, longitude, and elevation at 10 Hz)).

The memory and processing capacity may aid in management of processing configuration (e.g., loading, replacement), operations during a startup, and/or other operations. Consistent with the present disclosure, one or more of the various components of the system may be remotely disposed from one another, and/or aggregated. For example, one or more sensor components may be disposed distal from the capture device, e.g., such as shown and describe with respect to FIG. 1A. Multiple mechanical, sensory, or electrical units may be controlled by a learning apparatus via network/radio connectivity.

The apparatus 110 may also include user interface (UI) module 146. The UI module 146 may include any type of device capable of registering inputs from and/or communicating outputs to a user. These may include, without limitation, display, touch, proximity sensitive interface, light, sound receiving/emitting devices, wired/wireless input devices and/or other devices. The UI module 146 may include a display, one or more tactile elements (e.g., buttons and/or virtual touch screen buttons), lights (light emitting diode (LED)), speaker, and/or other UI elements. The UI module 146 may be operable to receive user input and/or provide information to a user related to operation of the capture device 110.

In one exemplary embodiment, the UI module 146 is a head mounted display (HMD). HMDs may also include one (monocular) or two (binocular) display components which are mounted to a helmet, glasses, or other wearable article, such that the display component(s) are aligned to the user's eyes. In some cases, the HMD may also include one or more cameras, speakers, microphones, and/or tactile feedback (vibrators, rumble pads). Generally, HMD's are configured to provide an immersive user experience within a virtual reality, augmented reality, or modulated reality. Various other wearable UI apparatuses (e.g., wrist mounted, shoulder mounted, hip mounted, etc.) are readily appreciated by artisans of ordinary skill in the related arts, the foregoing being purely illustrative.

In one such variant, the one or more display components are configured to receive an encoded video stream and render the display in accordance with the spatially weighted encoding quality parameters. For example, spatially weighted quality estimates can help deliver better quality in front of the eye (e.g., for an HMD viewing of spherical video) and much lower quality at the corners of the eye. In one such instance, the display component(s) is further configured to track the eye movement, so as to always present the highest quality video in the focus of the user. In another such variant, one or more cameras mounted on the HMD are configured to record and encode a video stream providing the appropriately spatially weighted encoding quality parameters as described in greater detail herein. In some cases, the HMD's accelerometers and/or other metadata information can be used to further inform and improve the encoding process (e.g., by accounting for motion blur, lighting, and other recording artifacts)

The apparatus 110 may include an input/output (I/O) interface module 148. The I/O interface module 148 may be configured to synchronize the capture device 110 with other cameras and/or with other external devices, such as a remote control, a second capture device 110, a smartphone, an external user interface device 120 of FIG. 1A and/or a video server. The I/O interface module 148 may be configured to communicate information to/from various I/O components. In some implementations the I/O interface module 148 may include a wired and/or wireless communications interface (e.g. Wi-Fi, Bluetooth, USB, HDMI, Wireless USB, Near Field Communication (NFC), Ethernet, a radio frequency transceiver, and/or other interfaces). In some implementations, the I/O interface module 148 may interface with LED lights, a display, a button, a microphone, speakers, and/or other I/O components. In one or more implementations, the I/O interface module 148 may interface to a power source, e.g., a battery, alternating current (AC), direct current (DC) electrical source.

The I/O interface module 148 of the apparatus 110 may include one or more connections to external computerized devices to allow for, inter alia, configuration and/or management of remote devices e.g., as described above with respect to FIG. 1A. The connections may include any of the wireless or wireline interfaces discussed above, and further may include customized or proprietary connections for specific applications. In some implementations, the communications interface may include a component (e.g., a dongle), including an infrared sensor, a radio frequency antenna, ultrasonic transducer, and/or other communications interfaces. In one or more implementation, the communications interface may include a local (e.g., Bluetooth, Wi-Fi) and/or broad range (e.g., cellular LTE) communications interface configured to enable communications between the capture device 110 and an external user interface device 120 (e.g., in FIG. 1A).

The apparatus 110 may include a power system that may be tailored to the needs of the application of the device. For example, for a small-sized lower power action camera, a wireless power solution (e.g. battery, solar cell, inductive (contactless) power source, and/or other power systems) may be used.

Methods—

Figure 2:
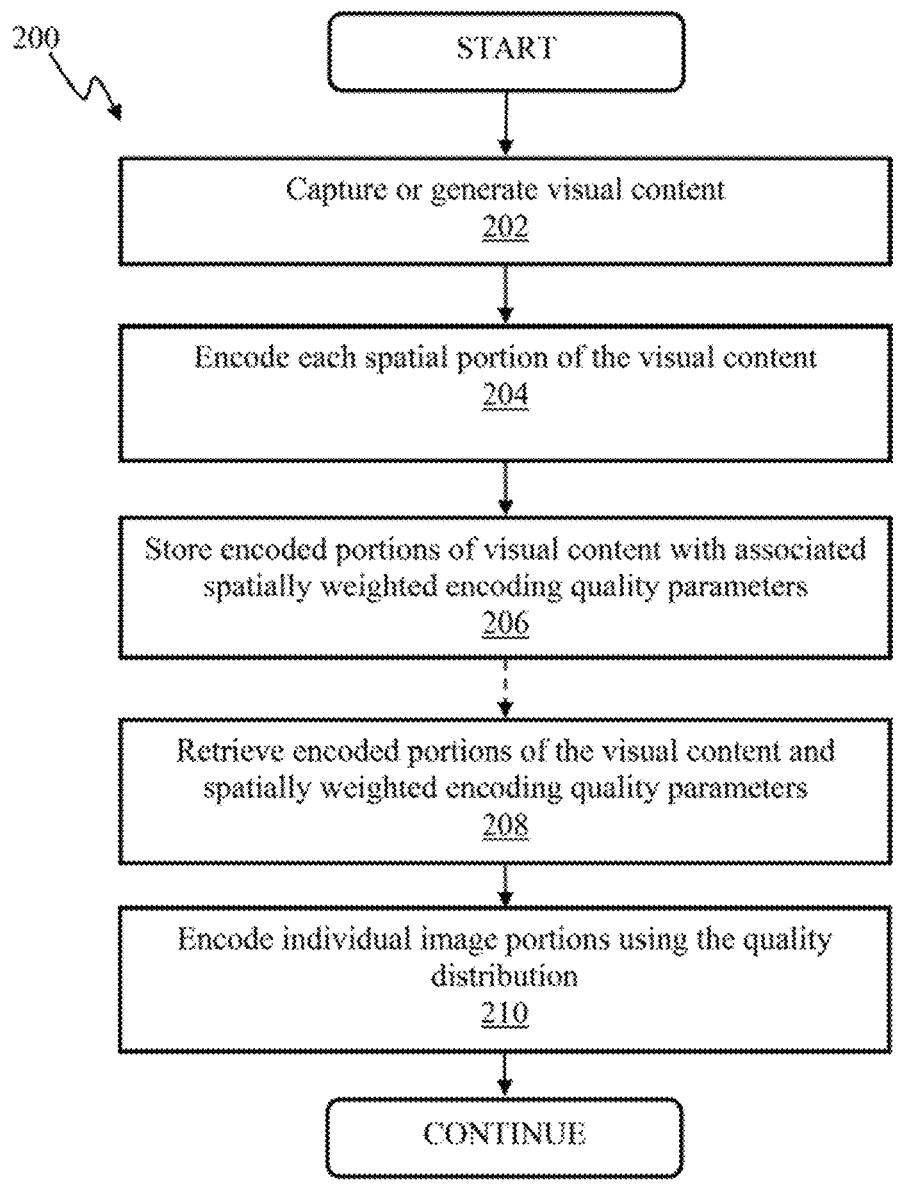
FIG. 2 is a logical flow diagram of one generalized method for providing spatially weighted encoding quality parameters to reflect differences in an underlying quality of visual content.

FIG. 2 illustrates one generalized method for providing spatially weighted encoding quality parameters to reflect differences in an underlying quality of visual content. As used herein, the terms "spatial weighting", "spatially weighted", and/or "spatial weight" refer to any association and/or relationship between an image space and e.g., encoding quality parameters. Spatial relationships may be defined according to mathematical relationships (or piecewise functions thereof) and/or arbitrary relationships (e.g., via a data structure or other association scheme.) Moreover, while the present discussion is primarily disclosed within the context of two (2) dimensional space of a "flat" image, artisans of ordinary skill in the related arts given the contents of the present disclosure will readily appreciate that the various principles described herein may be readily applied to e.g., one (1) dimensional space (e.g., along the axis of a panorama) or three (3) dimensional space (e.g., for light-field cameras, holograms and/or other 3D renderings.) Moreover, different coordinate systems may be used in characterizing or describing the space, including without limitation Cartesian (x, y, z), cylindrical (r, θ, z), and/or spherical (r, θ, φ) coordinates.

Referring now to step 202 of the method 200, visual content is captured and/or generated. In one exemplary embodiment, the visual content is captured via an image capture device that includes one or more cameras or other optical sensors. As used herein, the term "visual content" broadly applies to both "still" images as well as video images ("moving" images). For example, the visual content may be multiple images obtained with a six (6) lens capture device, e.g., such as described in U.S. patent application Ser. No. 14/927,343 entitled "APPARATUS AND METHODS FOR ROLLING SHUTTER COMPENSATION FOR MULTI-CAMERA SYSTEMS" filed on Oct. 29, 2015, incorporated supra. In other examples, stereo visual content (binocular content) can include left and right images (with slight parallax).

In another embodiment, visual content is generated either "from scratch" (e.g., computer generated graphics, computer modeling.) or rendered from other visual content (e.g., stitched together from other images). For example, a visual panorama of 360° may be obtained by stitching multiple images together (e.g., two (2) images of 180° obtained via a spherical lens). Similarly, entire artificial environments may be generated based on computer models (also referred to as "virtual reality"). Still further, various hybrid technologies meld image capture content with computer generated content along a continuum ranging from so-called "augmented reality" (addition of computer generated artifacts to image capture) to "modulated reality" (computer modification of image capture).

While the following discussion describes capture/generation mechanisms which may affect encoding quality as a function of image space, artisans of ordinary skill in the related arts will readily appreciate that spatially weighted encoding quality may also be determined during the encoding step 204 (described in greater detail infra). Still other variants may combine capture/generation information and encoding information when determining spatially weighted encoding quality, to varying degrees.

In one embodiment, the visual content is characterized by areas of varying quality. Quality may be quantitatively measurable and/or qualitatively perceptible. In one such variant, spatial distortions are a fixed attribute of the capture/generation mechanism. For example, as previously alluded to, a spherical lens introduces distortions as a function of distance from the center of the image; these distortions correspond to diminishing visual resolution at the periphery of the captured image. Accordingly, a spherical image has a lower effective resolution at its edges. Similarly, aperture settings will affect the quality of the captured image (i.e., the aperture determines the degree to which the light entering the camera is collimated, which directly affects the sharpness of the captured image). Certain aperture settings may result in high quality images inside a focal window, but poor capture quality for images outside the focal window. Artisans of ordinary skill in the related arts, given the contents of the present disclosure, will readily appreciate the variety of image capture settings and circumstances under which a captured image is prone to exhibit non-uniform image quality over the image space, the foregoing being purely illustrative.

Similarly, images which are rendered and/or generated may also exhibit certain areas that have predictably lower quality. For example, where rendering processes interpolate or extrapolate significant portions of the visual content there may be quality issues. Common examples of such rendering processes include without limitation: stretching, shrinking, stitching, blending, blurring, sharpening, and/or reconciling differences in parallax.

In another such variant, the areas of varying quality are a dynamic attribute of the capture/generation mechanism. For example, dynamic changes to image capture may include changes as to lighting, motion, or other capture conditions. In some variants, the image capture device may be able to discern (e.g., via edge detection or other quality metric) which portions of the captured image are the highest quality and/or lowest quality. In other variants, the user may be able to select (via a user interface or other selection scheme) the portions of the image are the highest and/or lowest quality. For example, an action video may capture some images that have been blurred by motion; upon review of the video, the user may be able to identify and indicate to the post-processing software that the foreground of the captured video is of high quality.

In another embodiment, fixed or dynamic spatial portions of the visual content may be marked for higher/lower quality encoding. In some variants, the portions of the visual content may be identified based on unchanging characteristics of the visual content (e.g., large swaths of relatively undifferentiated color due to sky or seascapes, etc.) In some variants, the amount of low quality visual content may be selected based on other considerations (e.g., to conserve memory, processing power, or other processing resources.) Still other variants may be indicated by the user (e.g. via a toggle switch), whereby the image capture device aggressively reduces/increases resolution based on the user's instruction (e.g., to capture anticipated action or conserve film for non-action shooting, or other lulls in activity over a temporal range.)

Figure 2A:
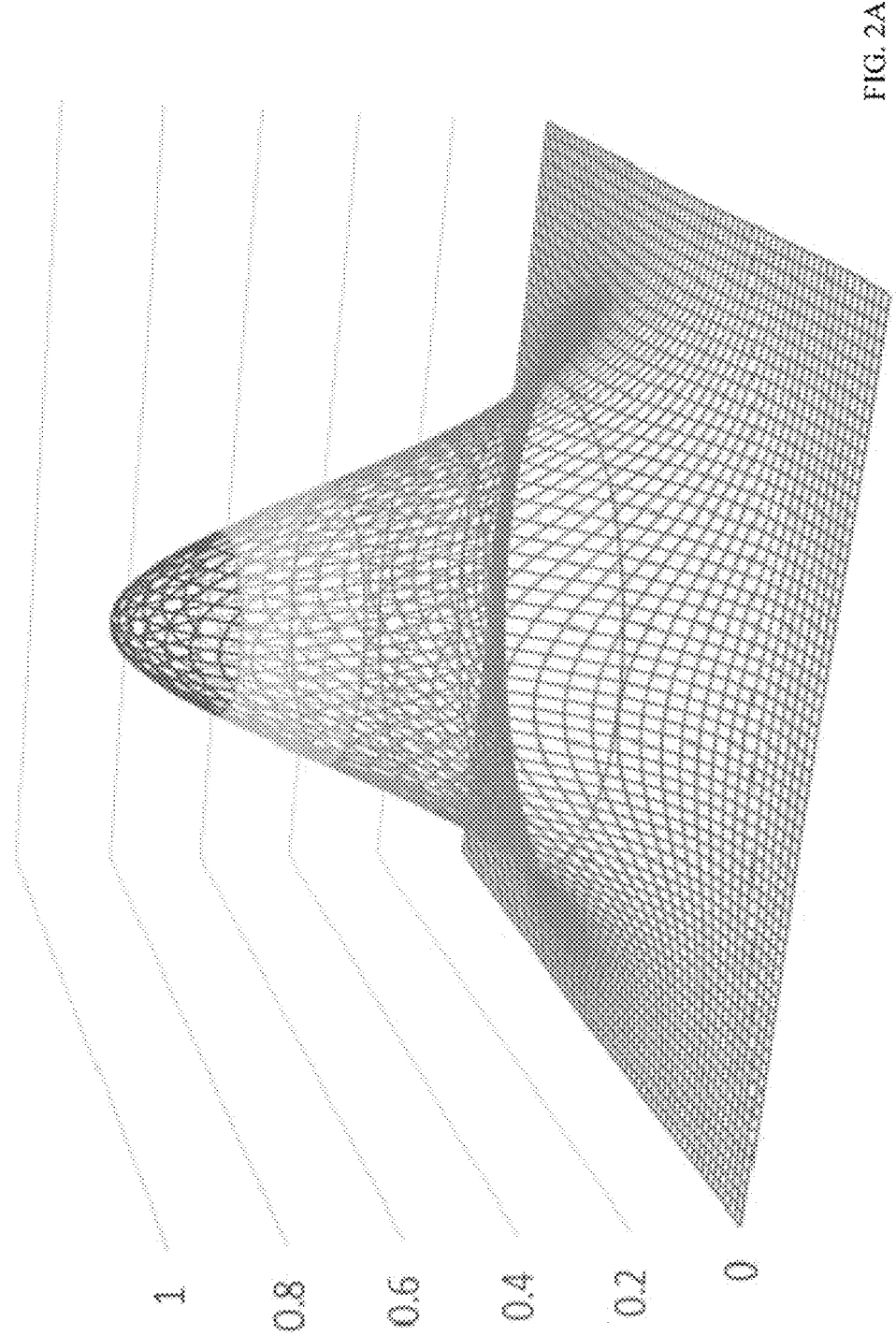
FIG. 2A is a three dimensional (3D) graphical plot of one exemplary radial mathematical relationship for spatial distortion, useful in conjunction with the principles described herein.

As previously noted, certain spatial qualities can be predictably determined based on mathematical relationships. For example, FIG. 2A illustrates one exemplary radial mathematical relationship for spatial distortion, where the two dimensional (2D) image encoding quality is represented by height in the $3^{rd}$ dimension. As shown in FIG. 2A, data that is located near the center of the image exhibits the highest quality (as indicated by the height of the peak at the center), however image quality falls off as a function of distance from the center (as indicated by the low periphery). Common scenarios where radial spatial encoding quality may be useful include, without limitation, e.g., spherical lens captures, image captures during forward (or backward) motion (i.e., perspective changes due to motion will dramatically affect the edge of the image, but minimally affect the center.) Other common radial relationships include without limitation e.g., Gaussian relationships (see FIG. 2B representing encoding quality as a function of a single dimension), "Mexican Hat" relationships (see FIG. 2C representing encoding quality as a function of a single dimension), and sinc function relationships (see FIG. 2D representing encoding quality as a function of a single dimension). Other common examples of mathematical relationships may include without limitation: the impulse function, center weighted broad window (wide band pass filter) dual wavelet function, dual Mexican Hat function, dual Gaussian function, dual impulse function, and/or any other such mathematically expressed relationship.

Figure 2F:
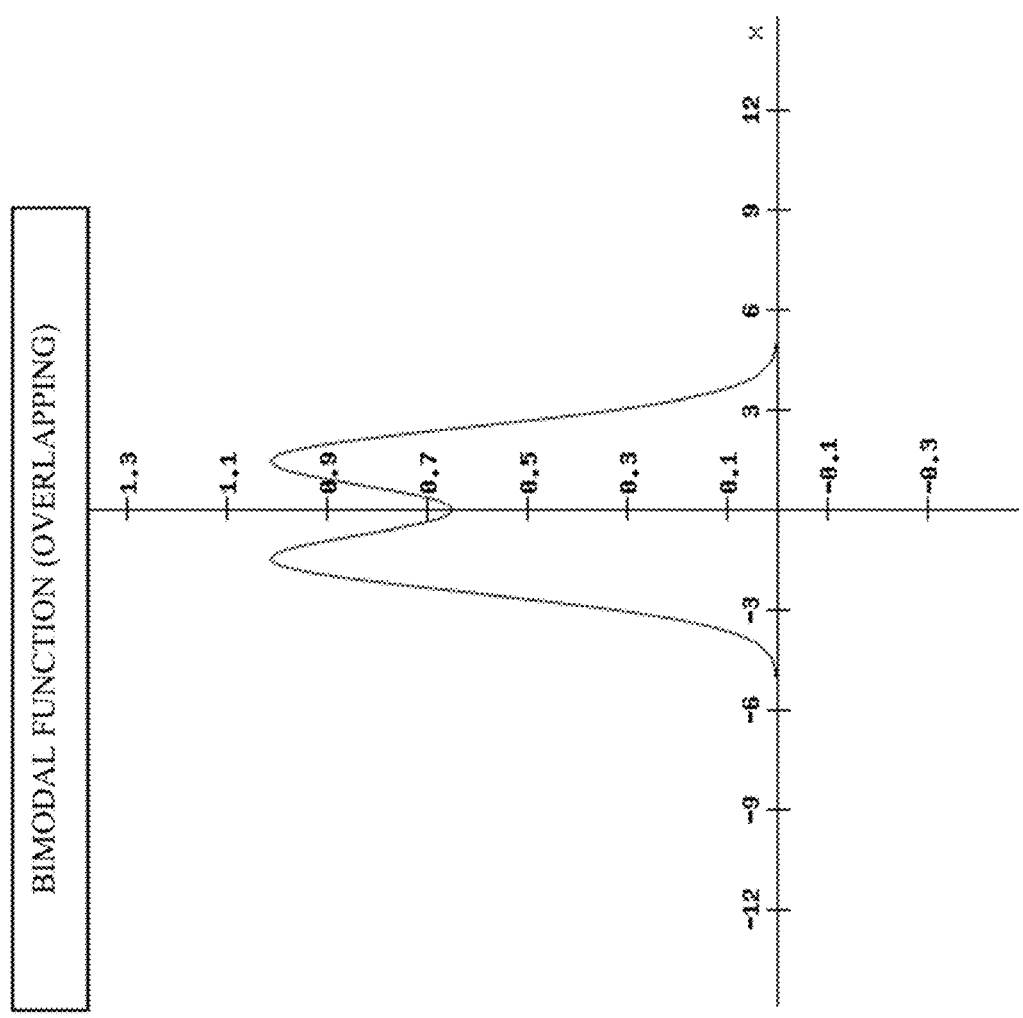
FIG. 2F is a two dimensional (2D) graphical plot of a second exemplary multimodal mathematical relationship for spatial distortion, useful in conjunction with the principles described herein.

In some cases, multiple spatial relationships may be superimposed to achieve multimodal variances (e.g., dual peaked, triple peaked, or higher order peaks.) For example, FIG. 2E illustrates a representation of a panoramic image which is stitched together from two (2) separate images, each image having its own radial peak. Notably, the center of the image which was extrapolated from the source images has a lower quality value (reflecting the uncertainty of the stitching process). FIG. 2F illustrates panoramic image which is stitched together from two (2) overlapping but separate images. The stitching process in FIG. 2F requires less extrapolation since the images overlap; thus, the median band has a higher level of quality when compared to FIG. 2E. Artisans of ordinary skill in the related arts, given the contents of the present disclosure, will readily appreciate the variety of spatial relationships that can be expressed as a superposition of multiple mathematical functions (e.g., spiked, flat-topped, multimodal.)

Figure 2G:
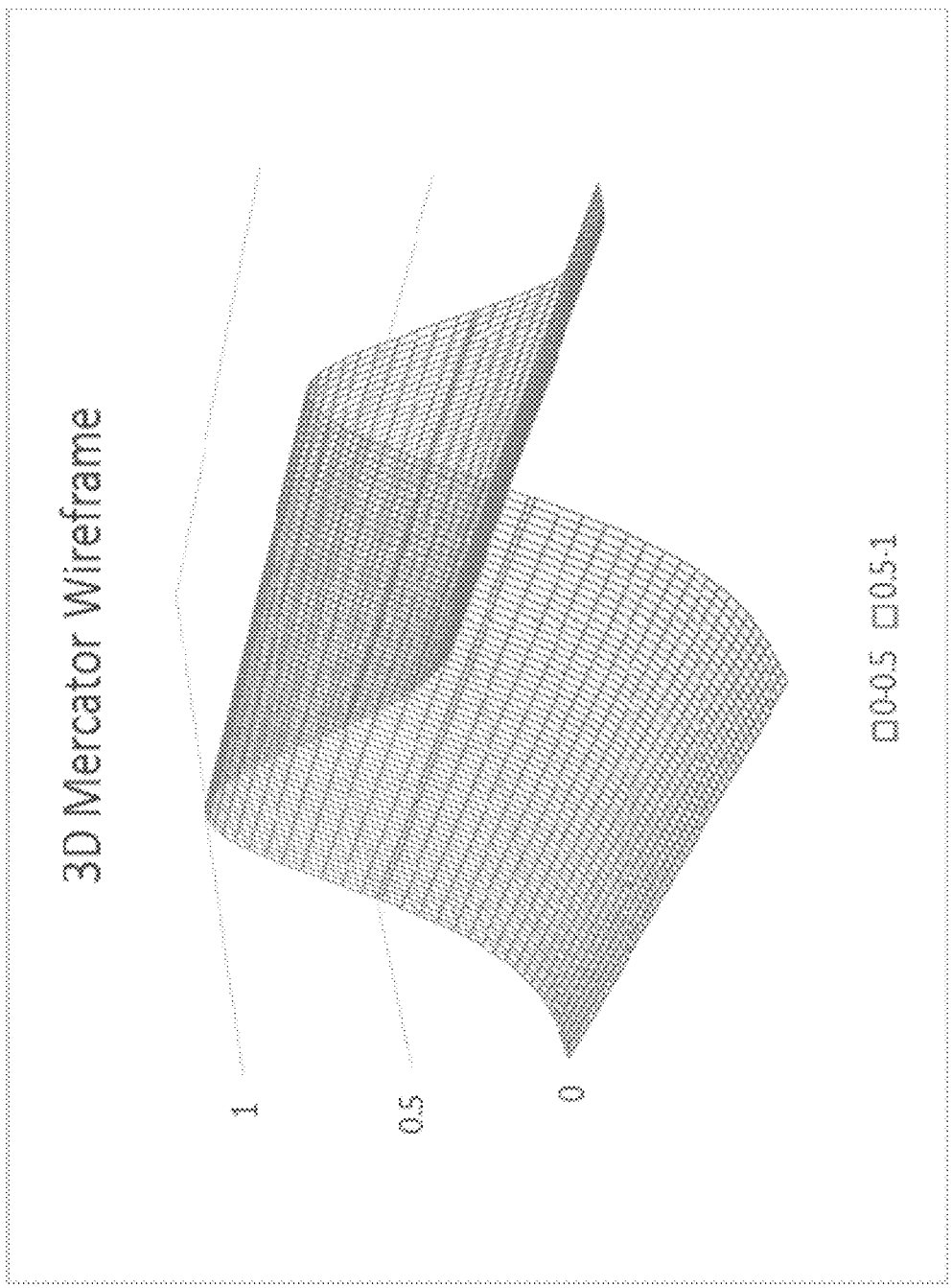
FIG. 2G is a three dimensional (3D) graphical plot of a first exemplary equirectangular mathematical relationship for spatial distortion, useful in conjunction with the principles described herein.

FIG. 2G illustrates another exemplary equirectangular (so-called "Mercator") projection of a mathematical relationship corresponding to spatial distortion where the two dimensional (2D) image encoding quality is represented by height in the 3rd dimension. As shown in FIG. 2G, the maximum quality for equirectangular projections is at the "equator", with lower quality assigned to the "poles". Still other variants of the equirectangular projection may have varying degrees of quality along one or more of the horizontal or vertical axis (e.g., the "latitudes" and/or "longitudes"). Generally, equirectangular projections may be particularly useful when stitching two or more uniformly encoded images into a single image having a non-uniform spatially weighted encoding quality (e.g., as certain features are stretched, shrunk, or otherwise modified.)

Figure 2H:
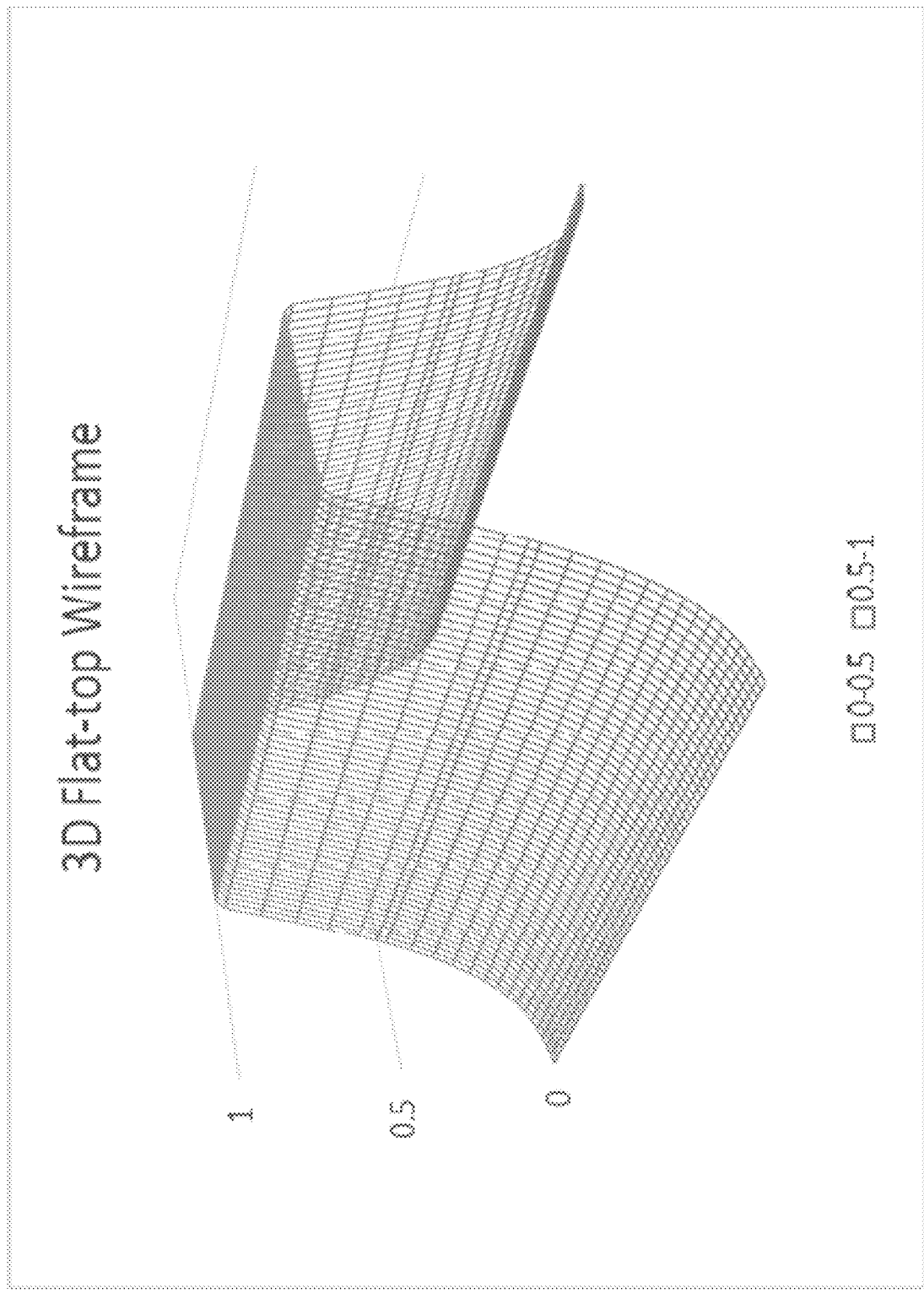
FIG. 2H is a three dimensional (3D) graphical plot of a second exemplary flattened equirectangular mathematical relationship for spatial distortion, useful in conjunction with the principles described herein.
Figure 21:
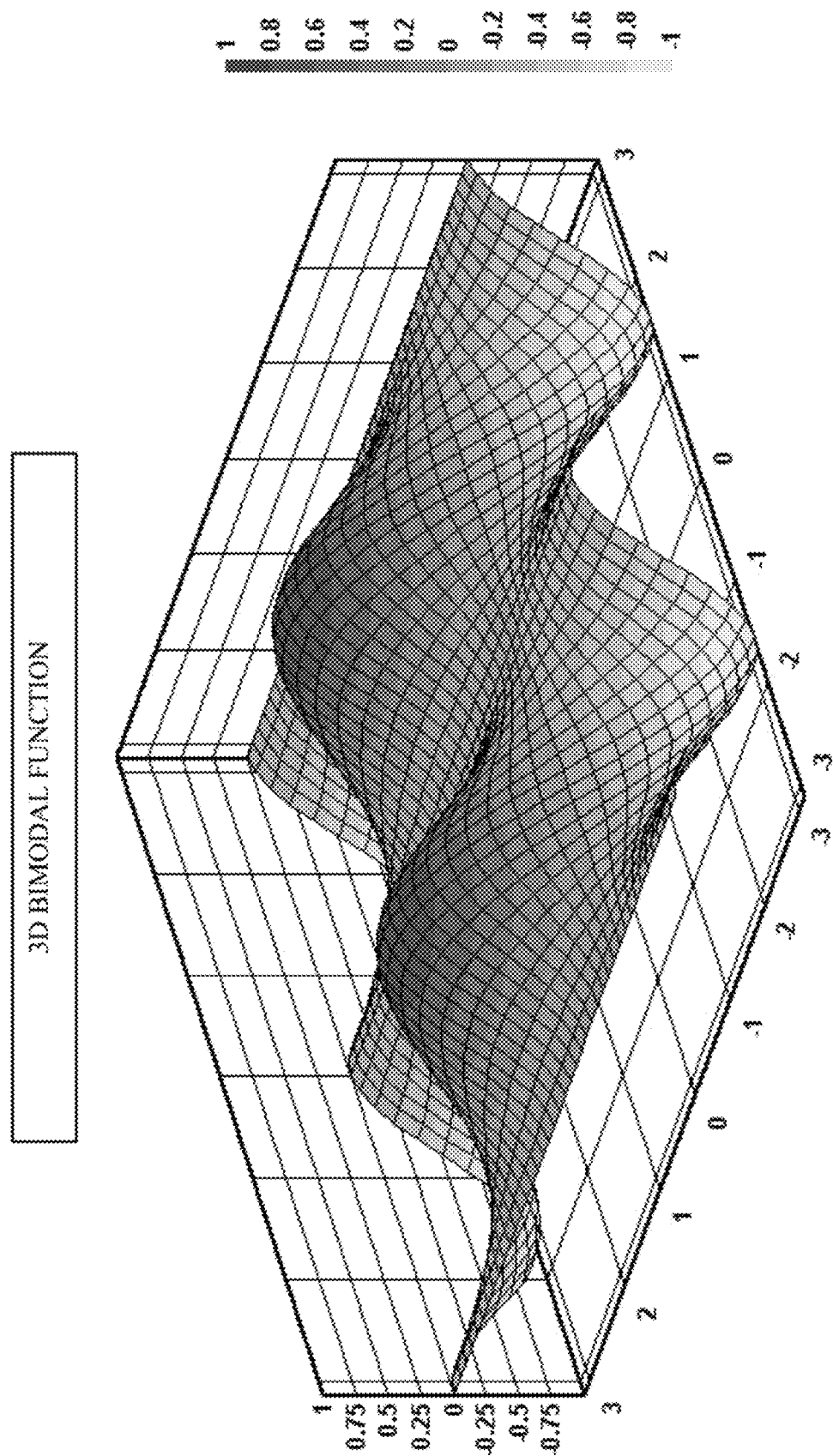

FIG. 2H illustrates a flattened version of an equirectangular projection (similar to FIG. 2G) where the two dimensional (2D) image encoding quality is represented by height in the 3rd dimension. As shown, the maximum encoding quality for equirectangular projections is relatively flat over a wide banded "equator", with lower quality assigned at the "poles". More directly, the image content that is represented within the wide banded equator is treated as having a high (and relatively similar) encoding quality; the encoding quality rapidly falls off outside of the widened equator, falling to the lowest quality outside at the poles.

FIG. 2I illustrates a multimodal projection where the two dimensional (2D) image encoding quality is represented by height in the 3rd dimension. As shown, the non-uniform spatially weighted encoding quality can vary greatly; in the illustrated plot, multiple peaks are shown which may correspond to e.g., individual spherical fields of view which have been stitched together in post-processing. In other words, the centers of the fisheyes are rendered with relatively little distortion, however stitching the images together requires at least some amount of stretching, shrinking, interpolation and/or extrapolation (represented by the corresponding valleys in the 3D plot); this modification to the source image content is represented by corresponding decreases in encoding quality.

Figure 2J:
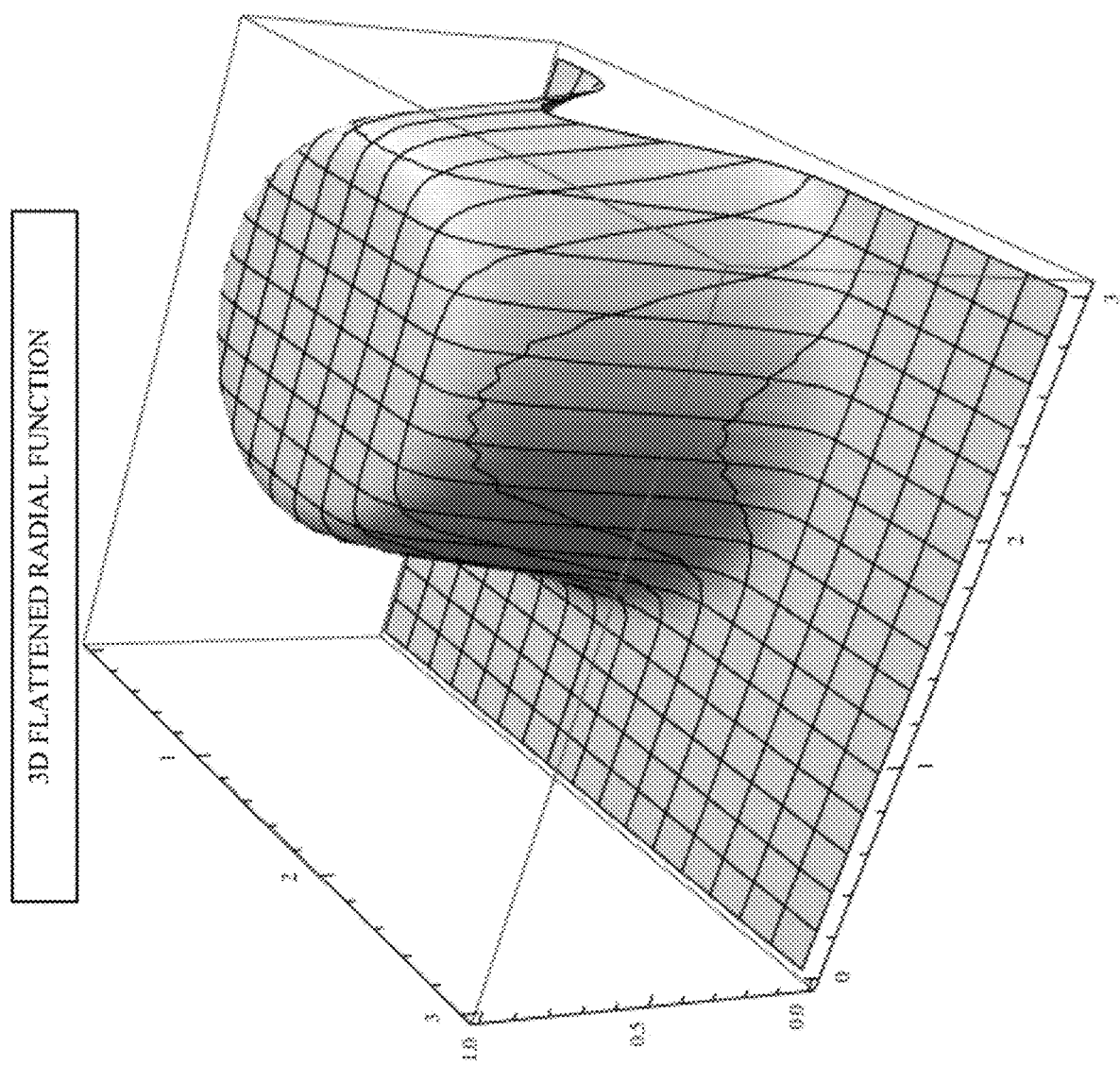
FIG. 2J is a three dimensional (3D) graphical plot of a flattened Gaussian mathematical relationship for spatial distortion, useful in conjunction with the principles described herein.

FIG. 2J illustrates a flattened version of a radial projection (similar to FIG. 2A) where the two dimensional (2D) image encoding quality is represented by height in the 3rd dimension. As shown, the maximum quality for the radial projection is relatively flat over a wide banded "spot", with lower quality assigned at the periphery. Additionally, as shown, the highest quality encoding spot is shifted. Shifts may occur where, for example, the post-processing has cropped portions of the original image content so as to direct focus (such as is commonly done in various artistic works, etc.). While the highest image encoding quality may not be centered within the edited image, artisans of ordinary skill in the related arts will readily appreciate that visual appeal may not always correspond to the highest quality capture (e.g., some motion blur, or other artistic selection may be desired).

Referring back to FIG. 2, at step 204 of the method 200, each spatial portion of the visual content is encoded for storage and/or post-processing. In one exemplary embodiment, encoding compresses the visual content to reduce storage burden. As a brief aside, compression codecs are generally classified as lossy or lossless. Lossy codecs use methods that create inexact approximations of the original visual content, and may discard some data. Lossy codecs are primarily used to reduce data size for storage, handling, and transmitting content. Lossless codecs use methods that create exact replicas of the original visual content; no data is discarded during compression. Lossless codecs generally cannot achieve the same degree of compression as lossy codecs. The degree and amount of compression under both lossy and lossless techniques may be based on device considerations such as memory, processing capability, power consumption, throughput/latency (for streaming applications), and/or other considerations. Common examples of such codecs include, without limitation, the aforementioned standard video compression codecs, e.g., H.264, H.265, Motion Picture Experts Group (MPEG), and/or VP9 video codec.

In another exemplary embodiment, the encoding scheme formats the visual content to facilitate post-processing functionality (e.g., video editing.) Typically, such encoding reduces the processing burden associated with certain types of post-processing. In one exemplary variant, the encoding scheme is based on a Cineform compression standard (used by the Assignee hereof), and described in U.S. Pat. No. 9,171,577 entitled "ENCODING AND DECODING SELECTIVELY RETRIEVABLE REPRESENTATIONS OF VIDEO CONTENT", filed on May 23, 2011, incorporated herein by reference in its entirety. As described therein, the Cineform format is a compressed video data structure that is selectively decodable to a plurality of resolutions including the full resolution of the uncompressed stream. During decoding, efficiency is substantially improved because only the data components necessary to generate a desired resolution are decoded. In variations, both temporal and spatial decoding are utilized to reduce frame rates, and hence, further reduce processor load.

As previously noted, capture/generation information may be used to inform encoding quality as a function of image space. Accordingly, in one exemplary embodiment, various portions of the image content may be encoded at e.g., higher/lower levels of loss and/or higher/lower levels of resolution based on the capture/generation information. For example, in an image that has a radial distortion (e.g., as with the lens of FIG. 2A), the center of the image content may be encoded at the highest quality, whereas the periphery may be allowed lower encoding rates. In another embodiment, a bi-modal stitched panorama image may be encoded at high fidelity for the two (2) peaks, but use a lower fidelity encoding for the stitched "median". In one exemplary implementation, the output compressed visual content is segmented and associated with its spatially weighted encoding quality parameters; thus for example, the visual content for the center of a radial quality image is associated with its corresponding high spatially weighted encoding quality parameters of the center. Similarly, the image components at the periphery are associated with their corresponding lower spatially weighted encoding quality parameters.

In another embodiment, the encoding process itself generates quality metrics. In one or more implementations, the encoding quality may be characterized by objective (or quantitative) quality metrics, such as mean square error (MSE), peak signal to noise ratio (PSNR), structural similarity (SSIM), etc. In some variants, the encoding quality metrics may be reference based (e.g., normalized scales, etc.); other variants may use non-reference based quality metrics.

Artisans of ordinary skill in the related arts will readily appreciate, given the contents of the present disclosure, that encoding quality metrics may be codec independent (and can be transferred across different codecs). Common examples of generic encoding quality metrics include without limitation: signal to noise ratio (SNR), modulation transfer function (MTF), and video quality measurement (VQM). Other encoding quality metrics may be codec dependent (and should be stripped out or converted when transferred to other formats.) Common examples of such encoding metrics include without limitation: building information modeling (BIM), media delivery index (MDI), bits per second (BPS), and/or sum of absolute differences (SAD).

The MSE may represent the cumulative squared error between the compressed and the original image, whereas PSNR may represent a measure of the peak error. Unlike existing schemes for generating quantitative metrics which calculate the metrics for the entire image, embodiments of the present disclosure determine the metric for each spatial region. For example, in one exemplary variant, the compressed image is segmented into a number of smaller spatial sections, and an encoding quality metric is calculated for each of the smaller spatial sections (based on the difference between the compressed subsection and the original subsection) and associated therewith.

In some cases, the spatial sections may be regular; for example, the spatial sections could be concentric rings for a radial spatial encoding relationship. In another such example, the spatial sections could be arranged according to a grid (useful for e.g., stitching applications, where image boundaries are curved and/or rectilinear, etc.) In other cases, the spatial sections may be irregular; for example, where the compressed image consists of a moving foreground against a uniform or semi-uniform background (such as snow or sky). The moving foreground will require high quality compression and may have corresponding high encoding quality parameters associated therewith, whereas the background can be rendered with relatively low quality compression.

In some implementations, subjective (or qualitative) quality metrics can be obtained by way of human input. For example, traditional mean opinion score (MOS) tests rely on a human test subject to rate the quality of reproduction on a scale of e.g., one (1) to five (5). Other common subjective metrics include without limitation: analysis of variance (ANOVA), summing and pooling, spatial regions of interest (ROI), etc. Thus, in one embodiment, the compressed image is segmented into a number of smaller spatial sections, and the human test subject can provide relative qualities associated with the spatial sections. In some cases, this may be performed over a battery of human subjects; in other embodiments, a single user may provide the input. In some cases, the spatial sections are predefined according to the visual input (e.g., radial, Cartesian, or other coordinate system). In other cases, the spatial sections may be identified by the user (e.g., by drawing with a finger on a touchscreen, or a mouse, or other interface device). Still other cases may use a drag-and-drop type interface with predefined spatial shape representations. In some cases, the user may have rough control over quality, such as according to a fuzzy logic scheme ("high", "low"); in other cases, the user may have a higher granularity scale (e.g., scale of one (1) to ten (10), a slider bar, or similar). Other schemes for receiving human subjective input are readily appreciated by those of ordinary skill in the related arts, given the contents of the present disclosure.

As used herein, "encoding quality" parameters (whether spatial, uniform, non-uniform, or some hybrid thereof) include without limitation, any information regarding: processing complexity, memory usage, error quantification/qualification, and/or human perceived quality. More directly, encoding quality parameters are information or metadata that are configured to be used by a post-processing function to identify appropriate resources for processing the image content.

Various encoder parameters may affect encoding quality, bitrate, and/or encoding computational efficiency. Common examples of encoder parameters include, but are not limited to: (i) quantization parameters (which specify the quantization granularity); (ii) so-called "dead zone" parameters (which specify the minimum quantization value); (iii) de-blocking filter strengths (i.e., to remove sharp edges (or "pixilation") created by codecs); (iv) motion vector search range; (v) transform mode selection; and/or (vi) encoder output bitrate. Moreover, artisans of ordinary skill in the related arts will further appreciate that apportioning the image into smaller or larger spatial areas allows for each of the spatial areas to be separately configured. This granularity may result in better resolution and/or post-processing efficiency but also possibly greater computational complexity. More directly, since each spatial area to be encoded/decoded is processed separately, higher spatial granularity directly results in higher encoding complexity (which may be offset by post-processing gains and/or other factors).

At step 206 of the method 200, the encoded portions of the visual content are stored with their associated spatially weighted encoding quality parameters. In some cases, the encoded portions of visual content are also stored with encoder parameters that are specific to the encoded portions and spatially weighted encoding quality parameters. In some cases, the encoded portions of visual content are stored according to legacy codec formats, with spatially weighted encoding parameters stored separately, thereby enabling backward compatible support (i.e., legacy devices can discard/ignore/not request the spatially weighted encoding quality parameters).

In one exemplary embodiment, the encoded portions are stored with spatially weighted encoding quality parameters in a common data structure. In one such variant, the encoded portions are separated into blocks, each block corresponding to a portion of the visual image (e.g., a tile, a ring, a polygon, or other apportionment.) Then each block is associated with a spatially weighted encoding quality parameter for that block that dictates the rendering quality that should be associated with the block. For example, consider an equirectangular projection where the image content is separated into a Cartesian array of tiles; each of the tiles is further associated with a spatially weighted encoding parameter. In this manner, differing tiles along the horizontal and/or vertical axis can be weighted for more or less post-processing effort. Moreover, artisans of ordinary skill in the related arts, given the contents of the present disclosure, will further appreciate that the tiled nature of the equirectangular projection can also support arbitrary spot weighting schemes (e.g., not along an axis). In another example, consider encoded spherical data that is stored with the spatial encoding quality parameters associated with each concentric rings (the effects correspond to a radial relationship that is represented by concentric rings). During subsequent post-processing, the rendering of the center of the spherical image can preferentially rely on the high quality center resolution (as indicated by the corresponding spatially weighted encoding parameter), and reduce reliance on the periphery portion of the image.

In some cases, the encoded portions are stored separate from, but cross referenced to, spatially weighted encoding parameters. Cross references may be stored via e.g., a hash table, a pointer array, database, or other data structure. In some cases, the cross references may be based on Cartesian coordinate, polar coordinates, spherical coordinates, or yet other coordinate systems.

In some embodiments, the spatially weighted encoding parameters define a mathematical relationship (or piecewise function thereof). In some cases, the spatially weighted encoding quality parameters define a function or curve that describes the spatially weighted encoding quality over the image space (as opposed to a particular coordinate or set of coordinates of the image space).

In one such variant, the mathematical relationship is derived or detected based on a spatial distortion introduced by the capture/generation mechanisms (e.g., distortions due to a lens and/or computer modeling.) Under such implementations, the mathematical relationship characterizes the distortion effects over the image space; for example, the codec approximates the distortion of the spatially weighted encoding parameters based on e.g., image capture of a lens. In some cases, where the relationship is pre-existing (e.g., via a limited number of compatibly manufactured camera lenses), the mathematical relationship can be described with a unique identifier (e.g., a part number). For example, many professional grade cameras include spatial distortion specifications as part of the camera's technical details. In other cases, where the relationship is not pre-existing, the user may e.g., input the mathematical relation based on user configurable settings and/or receive the appropriate mathematical relation online (via a support website, crowd-sourced).

In other variants, the mathematical relationship is empirically derived from spatially weighted encoding metrics determined during the encoding process. Under such schemes, the mathematical relationship is calculated based on points and used for e.g., line fitting, curve fitting, or other plotting. More directly, by interpolating between the spatially weighted encoding metrics determined during the encoding process, a line fitted or curve fitted mathematical relationship can be generated over the entire image space.

Still other schemes for combining, deriving, and/or storing non-uniform spatially weighted encoding parameters will be readily appreciated by those of ordinary skill in the related arts, given the contents of the present disclosure. For example, consider a visual panorama of 360° that is generated by stitching multiple images together (e.g., two (2) images of 180° obtained via spherical lens); a hybrid of the foregoing method may combine mathematical relationships (e.g., determined based on the lens type), with grid-based/spot-based parameters (e.g., based on the stitching and post-processing of the borders), to create an overall set of non-uniform spatially weighted encoding parameters for the panoramic 360° visual content. Other schemes for providing non-uniform spatially weighted encoding parameters may be used so as to direct attention to particular features of the image; for example, the encoding process may intelligently perform an initial step of e.g., facial recognition, marker identification, laser designation, or other feature identification and concentrate processing resources toward high encoding quality for the identified feature (the remaining spaces of the image are coded at lower qualities). Still some variants may consider applicable device resources, movement, and/or other considerations when encoding image data; for instance, greater or fewer spatial regions of an image may be encoded at higher or lower quality, depending on available processor cycles and/or memory constraints.

Subsequently thereafter, at step 208 of the method 200 the encoded portions of the visual content and associated encoding qualities are retrieved for replay, post-processing, editing, or other rendering process. In some embodiments, legacy support can be offered to unsophisticated clients by allowing access to the encoded portions of the visual content without the associated non-uniform spatially weighted encoding parameters (e.g., by truncating or stripping the parameters out of the data stream.) In some cases, the encoded portions of visual content have been stored according to legacy codec formats, and the spatially weighted encoding parameters are separately retrieved by capable rendering processes. In one exemplary embodiment, retrieval of the encoded portions of the visual content and associated encoding qualities further include encoder parameters that are specific to the encoded portions and spatially weighted encoding quality parameters.

In some embodiments, only selected portions of the visual content (and its associated spatially weighted encoding parameters) are retrieved. Limited retrieval may be especially useful where only a portion of the visual content is being replayed, post-processed, edited, and/or rendered. For example, the visual content is panoramic 360° visual content, only a portion of the content may be necessary to be rendered (e.g., the portion of the panorama that the user is viewing).

In some variants, the spatially weighted encoding parameters must be derived at time of retrieval; for example, only a relevant subset of the mathematical relationship for the spatially weighted encoding quality may be necessary when only a portion of the image is being rendered. In another such example, the spatially weighted encoding parameters may only specify certain portions of the image content; thus, unspecified portions may use a default value and/or interpolate/extrapolate a quality value from the known spatially weighted encoding parameters. Still other variants of parameter derivation will be appreciated by artisans of ordinary skill given the contents of the present disclosure.

At step 210 of the method 200, one or more derivative visual content is generated based on the visual content and the associated encoding qualities. In some cases, the rendering may additionally be based on encoder parameters associated with the visual content. In some variants, the derivative visual content is further generated based on the display device (and/or application) resolution and capabilities. More generally, spatially weighted quality estimation can be used by the decoder to improve resolution, improve estimation algorithms, reduce processing complexity, redirect processing effort, and/or improve rendering speed. Such benefits may be leveraged by different display devices to support a variety of applications such as e.g., HMDs, smart phones, tablets, TVs, As used herein, the term "derivative" visual content is used to indicate that the rendering device intelligently and/or dynamically adjusts its rendering process based on the non-uniform spatially weighted encoding quality parameters.

In one exemplary embodiment, the one or more derivative visual content is generated by allocating an amount of processing and/or memory resources based on, and/or commensurate with the associated encoding quality. For example, the rendering device can allocate a larger amount of resources for decoding spatial sections of the image which have higher spatially weighted encoding quality, and allocate fewer resources for lower weighted areas. By focusing processing resources to maximize output quality for visual content that is most important, exemplary rendering devices can render the image faster, reduce bandwidth and processing cycles, and reduce energy use. More directly, even though poorly encoded sections may have lower visual quality, certain considerations may be more important. For example, an HMD may require exceptionally fast responsivity (for gaming applications, or immersive contexts). In another example, a smart phone may have a smaller display that provides acceptable performance with lower visual quality; however, the smart phone may prioritize power consumption. In still another example, a tablet, smartphone, (or other similarly enabled device) may intelligently select how much or little of the image to render, based on e.g., distance from the user. For example, a tablet that has facial recognition capabilities may be able to determine a relative distance of the user's face and choose to render at different qualities, depending on whether the user is close or farther away.

In another exemplary embodiment, the rendering device may allocate normal codec resources for decoding the higher weighted areas, but expend additional resources for reconstructing the lower weighted areas based on interpolation/extrapolation (which may actually require more processing effort). Since normal codecs may be implemented within power efficient hardened logic (e.g., ASICs), the overall process may yield higher quality graphical outputs and/or resolutions. In some cases, offloading the high quality portions of the visual content to a hardened logic may also lower overall power consumption (when compared with using a general processor to decode the visual content in its entirety). Common examples of such applications may include high-end post-processing (where the user attempts to sharpen or modify previously captured data), and/or upscaling of legacy content for e.g., newer display technologies.

The non-uniform spatially weighted encoding quality parameters may also be used by post-processing to e.g., correct for contradictory information from multiple images. For example, stitching software attempts to "stitch" two or more images together to generate a larger image. Due to parallax effects between multiple images, the stitching software must stretch, shrink, and interpolate/extrapolate data from the multiple images to create a seamless median. Since existing images do not have encoding quality parameters, prior art stitching algorithms generally made a "best guess" (usually, an equally weighted average). However, exemplary embodiments of the present disclosure enable stitching software to appropriately weight the contradictory image information based on the underlying image quality weight. In other words, the stitching software can intelligently choose to blend based on the image with higher quality in that spatial area.

In some embodiments, legacy images can be post-processed to add non-uniform spatially weighted encoding parameters. Such features may be especially useful for mixed processing (e.g., stitching together enhanced images with legacy images, correcting enhanced image weight, and/or stitching together legacy images.) For example, in some cases, the derivative image is segmented into a number of smaller spatial sections, and the human user can provide relative qualities associated with the spatial sections. In some cases, the spatial sections are predefined according to the visual input (e.g., radial, Cartesian, or other coordinate mechanism.) In other cases, the spatial sections may be identified by the user (e.g., by drawing with a finger on a touchscreen, or a mouse, or other user interface). Still other cases may use a drag-and-drop type interface with pre-defined spatial shape representations. In some cases, the user may have rough control over quality ("high", "low"); in other cases, the user may have a higher granularity scale (e.g., scale of one (1) to ten (10), a slider bar, or other scaling.) Other schemes for receiving human subjective input are readily appreciated by those of ordinary skill in the related arts, given the contents of the present disclosure.

Usage Scenarios—

Figure 3:
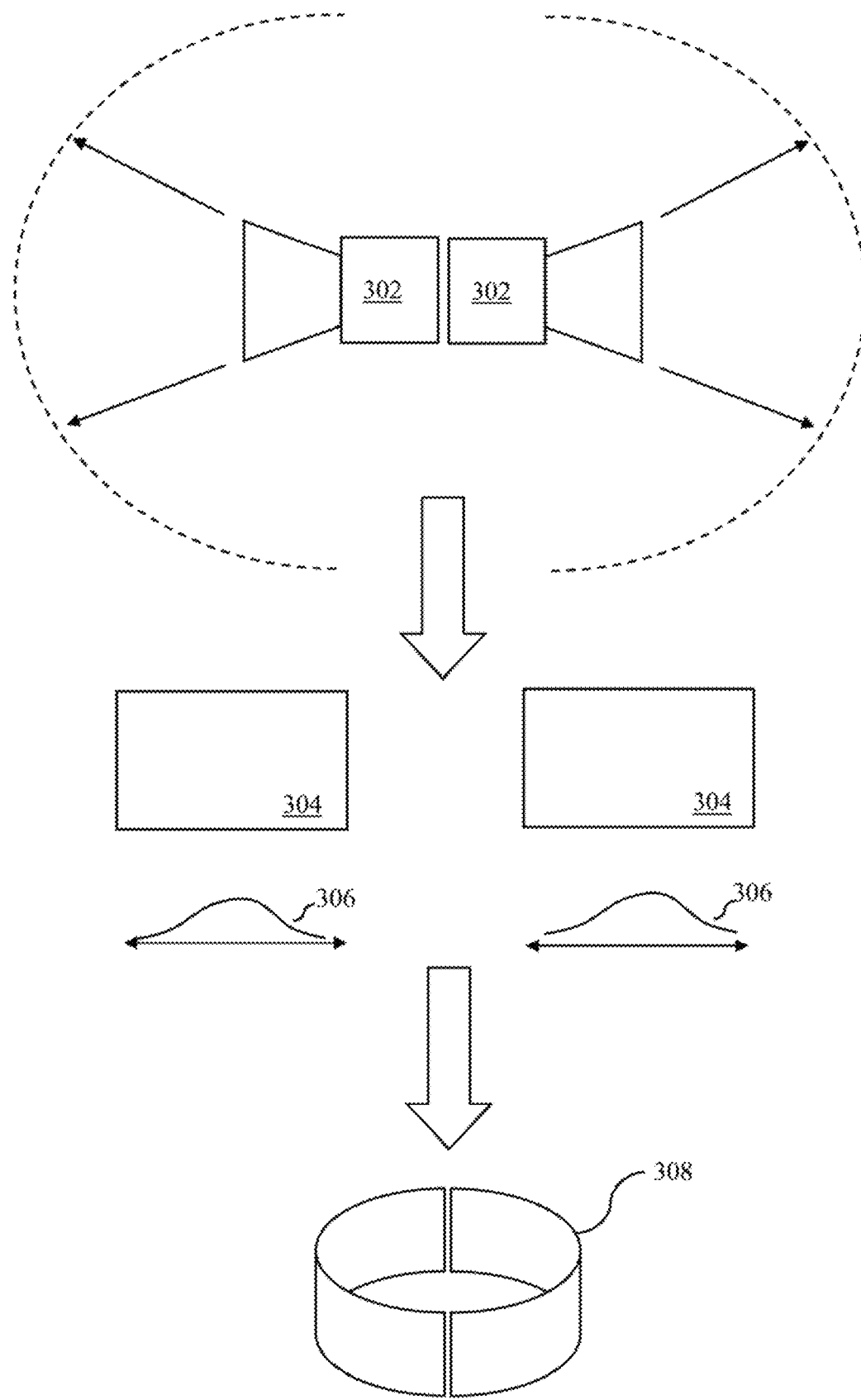
FIG. 3 illustrates one exemplary scenario for generating a panoramic image from multiple camera images, consistent with the principles described herein.

FIG. 3 illustrates one exemplary scenario for generating a panoramic image from multiple camera images. As shown in FIG. 3, two (2) spherical cameras 302 are arranged in a back-to-back configuration; each camera has a 180° field of view (obtained via a spherical lens). During operation, two (2) images 304 are captured simultaneously, each having radial spatially weighted encoding parameters as a function of the spherical lenses, (as represented by graphs 306). The image output 308 is stitched together from the images 304 based on their associated graphs 306, to create a visual panorama of 360°. While the present disclosure describes two (2) cameras, artisans of ordinary skill in the related arts will readily appreciate that the following description is purely illustrative; embodiments with a greater number of cameras are readily appreciated. For example, other common multi-camera embodiments may use three (3), four (4), six (6), sixteen (16) and/or other numbers of cameras.

The graphs 306 denote the spatially varying quality of encoding of content. While the present example illustrates a radial weight distribution i.e., the center of the field of view has an increased level of quality as compared to the peripheries. The quality level of the edges may be referred to as the nominal base quality level; whereas the quality level of the center portion of curve 306 may be referred to as the enhanced quality level. In some implementations, the nominal base quality level of curve may be configured below a minimum quality level for encoding the overall image 304, as shown in FIG. 3. In other implementations, the nominal base quality level of curve 304 may be configured equal or may exceed the minimum quality level. As previously noted, the spatial weighting of the quality estimator does not have to match exactly with the spatial distortion of the camera lens; various weightings can also consider other attributes such as motion, viewer's perspective of "importance" information, and/or other considerations.

Figure 4:
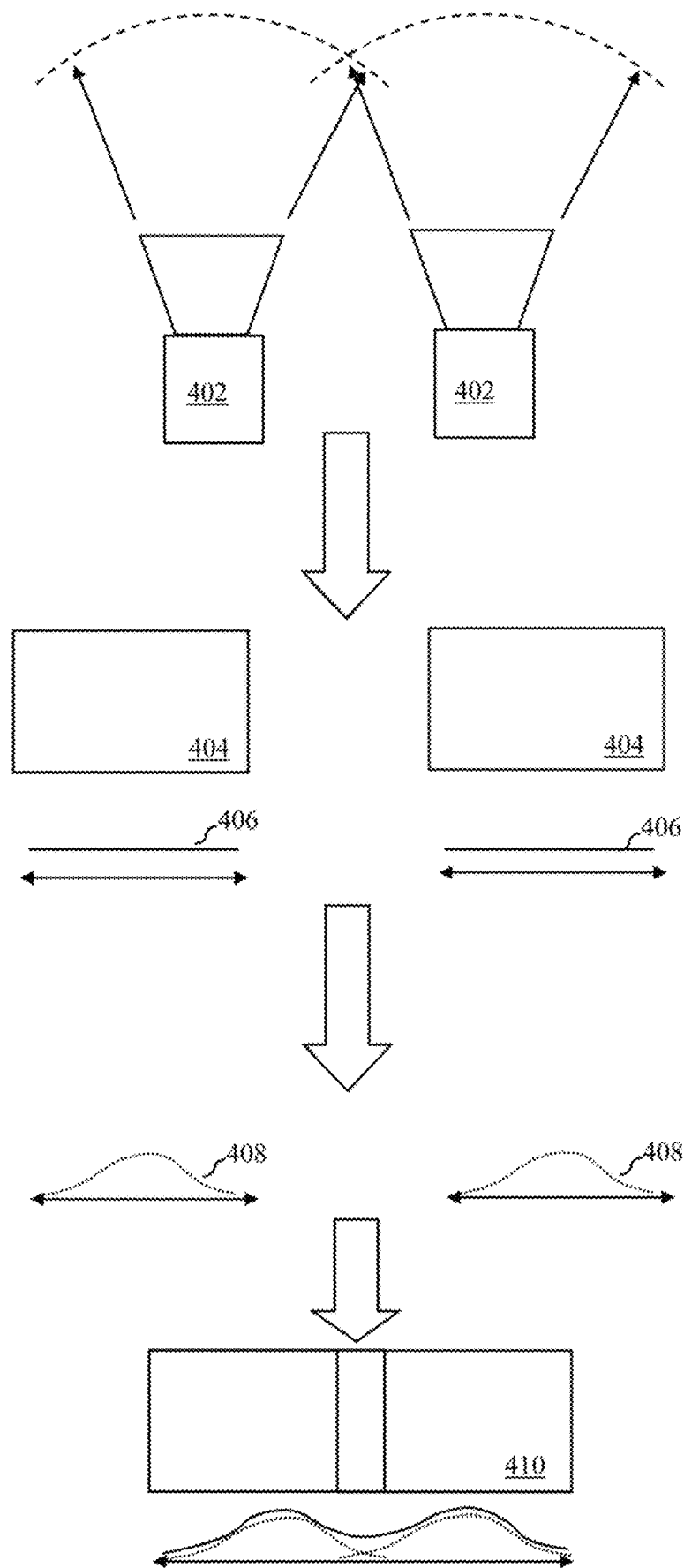
FIG. 4 illustrates one exemplary scenario for generating a stereoscopic image from legacy camera images, consistent with the principles described herein.

FIG. 4 illustrates one exemplary scenario for generating a stereoscopic image from legacy camera images. As shown in FIG. 4, two (2) equirectangular cameras 402 are arranged in a side-to-side configuration; each camera has a 60° field of view (obtained via an equirectangular lens). During operation, two (2) images 404 are captured simultaneously under traditional encodings (i.e., each has) uniformly weighted encoding parameters (as represented by graphs 406). During post-processing, the user manually adjusts the weighted encoding parameters 408, and re-renders the scene using the weighted encoding parameters 410. As additionally illustrated in FIG. 4, the outputted stereoscopic image may additionally retain the newly created non-uniform spatial encoding quality parameters (which are bimodal in the illustrated embodiment.)

Where certain elements of these implementations can be partially or fully implemented using known components, only those portions of such known components that are necessary for an understanding of the present disclosure are described, and detailed descriptions of other portions of such known components are omitted so as not to obscure the disclosure.

In the present specification, an implementation showing a singular component should not be considered limiting; rather, the disclosure is intended to encompass other implementations including a plurality of the same component, and vice-versa, unless explicitly stated otherwise herein.

Further, the present disclosure encompasses present and future known equivalents to the components referred to herein by way of illustration.

As used herein, the terms "computer", "computing device", and "computerized device", include, but are not limited to, personal computers (PCs) and minicomputers, whether desktop, laptop, or otherwise, mainframe computers, workstations, servers, personal digital assistants (PDAs), handheld computers, embedded computers, programmable logic device, personal communicators, tablet computers, portable navigation aids, J2ME equipped devices, cellular telephones, smart phones, personal integrated communication or entertainment devices, or literally any other device capable of executing a set of instructions.

As used herein, the term "computer program" or "software" is meant to include any sequence or human or machine cognizable steps which perform a function. Such program may be rendered in virtually any programming language or environment including, for example, C/C++, C#, Fortran, COBOL, MATLAB™, PASCAL, Python, assembly language, markup languages (e.g., HTML, SGML, XML, VoXML), and the like, as well as object-oriented environments such as the Common Object Request Broker Architecture (CORBA), Java™ (including J2ME, Java Beans), Binary Runtime Environment (e.g., BREW), and the like.

As used herein, the terms "connection", "link", "wireless link" means a causal link between any two or more entities (whether physical or logical/virtual), which enables information exchange between the entities.

As used herein, the terms "integrated circuit", "chip", and "IC" are meant to refer to an electronic circuit manufactured by the patterned diffusion of trace elements into the surface of a thin substrate of semiconductor material. By way of non-limiting example, integrated circuits may include field programmable gate arrays (e.g., FPGAs), a programmable logic device (PLD), reconfigurable computer fabrics (RCFs), systems on a chip (SoC), application-specific integrated circuits (ASICs), and/or other types of integrated circuits.

As used herein, the term "memory" includes any type of integrated circuit or other storage device adapted for storing digital data including, without limitation, ROM. PROM, EEPROM, DRAM, Mobile DRAM, SDRAM, DDR/2 SDRAM, EDO/FPMS, RLDRAM, SRAM, "flash" memory (e.g., NAND/NOR), memristor memory, and PSRAM.

As used herein, the terms "microprocessor" and "digital processor" are meant generally to include digital processing devices. By way of non-limiting example, digital processing devices may include one or more of digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, application-specific integrated circuits (ASICs), and/or other digital processing devices. Such digital processors may be contained on a single unitary IC die, or distributed across multiple components.

As used herein, the term "Wi-Fi" includes one or more of IEEE-Std. 802.11, variants of IEEE-Std. 802.11, standards related to IEEE-Std. 802.11 (e.g., 802.11 a/b/g/n/s/v), and/or other wireless standards.

As used herein, the term "wireless" means any wireless signal, data, communication, and/or other wireless interface. By way of non-limiting example, a wireless interface may include one or more of Wi-Fi, Bluetooth, 3G (3GPP/3GPP2), HSDPA/HSUPA, TDMA, CDMA (e.g., IS-95A, WCDMA, and/or other wireless technology), FHSS, DSSS, GSM, PAN/802.15, WiMAX (802.16), 802.20, narrowband/FDMA, OFDM, PCS/DCS, LTE/LTE-A/TD-LTE, analog cellular, CDPD, satellite systems, millimeter wave or microwave systems, acoustic, infrared (i.e., IrDA), and/or other wireless interfaces.

As used herein, the term "camera" may be used to refer to any imaging device or sensor configured to capture, record, and/or convey still and/or video imagery, which may be sensitive to visible parts of the electromagnetic spectrum and/or invisible parts of the electromagnetic spectrum (e.g., infrared, ultraviolet), and/or other energy (e.g., pressure waves).

It will be recognized that while certain aspects of the technology are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure disclosed and claimed herein.

While the above detailed description has shown, described, and pointed out novel features of the disclosure as applied to various implementations, it will be understood that various omissions, substitutions, and changes in the form and details of the device or process illustrated may be made by those skilled in the art without departing from the disclosure. The foregoing description is of the best mode presently contemplated of carrying out the principles of the disclosure. This description is in no way meant to be limiting, but rather should be taken as illustrative of the general principles of the technology. The scope of the disclosure should be determined with reference to the claims.

What is claimed:

1. A computerized apparatus, comprising:
a non-transitory computer-readable apparatus having a storage medium, the storage medium comprising one or more computer-executable instructions that are configured to, when executed by one or more processor apparatus, cause the computerized apparatus to:
obtain visual content from an image capture device, the visual content comprising a plurality of spatial portions;
encode each of the plurality of spatial portions of the visual content using respective spatially weighted encoding quality parameters, the respective spatially weighted encoding quality parameters comprising information associated with resources configured for post-processing the visual content; and
generate one or more derivative content based on the encode of each of the plurality of spatial portions of the visual content.

2. The computerized apparatus of claim 1, wherein the obtaining of the visual content from the image capture device comprises obtaining of the visual content generated from one or more optical sensors.

3. The computerized apparatus of claim 1, wherein the obtaining of the visual content comprises generation of the visual content via performance of at least a render operation using at least a plurality of images, the render operation comprising a stitch of the at least plurality of images.

4. The computerized apparatus of claim 3, wherein the stitch of the at least plurality of images comprises an evaluation of at least some of the respective spatially weighted encoding quality parameters, the evaluation enabling the computerized apparatus to weight image information contained in respective ones of the at least plurality of images based on the respective spatially weighted encoding quality parameters.

5. The computerized apparatus of claim 1, wherein the one or more computer-executable instructions are further configured to, when executed by the one or more processor apparatus, to cause the computerized apparatus to decode one or more of the plurality of spatial portions of the visual content; and
wherein the generation of the one or more derivative content is further based on data relating to one or more capabilities associated with a display device that is configured to render the one or more derivative content after generation thereof.

6. The computerized apparatus of claim 1, wherein the one or more computer-executable instructions are further configured to, when executed by the one or more processor apparatus, cause the computerized apparatus to allocate an amount of resources for a decode of the one or more of the plurality of spatial portions, the allocation based at least on respective one or more spatially weighted encoding quality parameters associated with the one or more spatial portions.

7. The computerized apparatus of claim 1, wherein the respective spatially weighted encoding quality parameters are associated with a distribution curve that is descriptive of a quality level as a function of location within the visual content.

8. A non-transitory computer-readable apparatus comprising a storage medium having at least one computer program therein, the at least one computer program comprising a plurality of instructions configured to cause, when executed by a processor apparatus:
generation of content based on one or more images captured via at least one image capturing device;
based on at least one respective encoding parameter associated with each of a plurality of portions of the generated content, processing of each of the plurality of portions of the generated content; and
rendering of encoded content based at least on the processing of each of the plurality of portions of the generated content, portions of the encoded content being associated with respective levels of image quality corresponding to the respective encoding parameters.

9. The non-transitory computer-readable apparatus of claim 8, wherein the plurality of instructions are further configured to cause, when executed by the processor apparatus:
pre-processing of the each of the plurality of portions of the generated content for storage;
storage of at least the pre-processed plurality of portions of the generated content along with the respective encoding parameters within a data structure; and
retrieval of the pre-processed plurality of portions of the generated content and the respective encoding parameters for said processing of each of the plurality of portions of the generated content.

10. The non-transitory computer-readable apparatus of claim 8, wherein the generated content comprises an at least hemipherical image, and a center portion of the at least hemispherical image is associated with greater image quality as compared to one or more peripheral portions of the at least hemispherical image.

11. The non-transitory computer-readable apparatus of claim 8, wherein the respective encoding parameters are associated with a mathematical distribution function that is descriptive of a quality level as a function of position within the generated content.

12. The non-transitory computer-readable apparatus of claim 11, wherein the mathematical distribution function is based at least in part on a spatial distortion introduced by the image capturing device.

13. The non-transitory computer-readable apparatus of claim 8, wherein the plurality of instructions are further configured to cause, when executed by the processor apparatus:

determination of the respective encoding parameters based at least in part on one or more parameters associated with at least one lens of the image capturing device.

14. The non-transitory computer-readable apparatus of claim 8, wherein the processing of each of the plurality of portions of the generated content comprises application of the at least one respective encoding parameter to encode each of the plurality of portions of the generated content.

15. A method of processing digital image data, the method comprising:
   obtaining visual content having a plurality of spatial portions;
   processing each of the plurality of spatial portions of the visual content based on one or more encoding quality parameters, each of the one or more encoding quality parameters being specific to respective ones of each of the plurality of spatial portions; and
   generating derivative content based at least on the processing of each of the plurality of spatial portions of the visual content, the derivative content having (i) one or more areas associated with a first quality level, and (ii) one or more areas associated with a second quality level that is greater than the first quality level.

16. The method of claim 15, wherein the encoding quality parameters are described via at least a distribution function, the distribution function relating encoding quality to position within a coordinate system associated with the obtained visual content.

17. The method of claim 16, further comprising:
   adjusting the encoding quality parameters, the adjusting the encoding quality parameters resulting in at least an adjustment of the distribution function to produce an adjusted distribution function; and
   generating second derivative content based at least on the adjusted distribution function.

18. The method of claim 15, further comprising determining at least some of the encoding quality parameters based on a time of retrieval of the at least some of the encoding quality parameters.

19. The method of claim 15, wherein the generating of the derivative content is further based on a rendering capability associated with a display device that is configured to render the generated derivative content.

20. The method of claim 15, wherein the obtaining of the visual content comprises producing at least a panoramic image, the panoramic image comprising a combination of multiple source images.

* * * * *